United States Patent
Teuton et al.

(10) Patent No.: US 10,832,059 B2
(45) Date of Patent: Nov. 10, 2020

(54) FEATURE IDENTIFICATION OR CLASSIFICATION USING TASK-SPECIFIC METADATA

(71) Applicant: Battelle Memorial Institute, Richland, WA (US)

(72) Inventors: Jeremy R. Teuton, Pasco, WA (US); Richard L. Griswold, West Richland, WA (US)

(73) Assignee: Battelle Memorial Institute, Richland, WA (US)

(*) Notice: Subject to any disclaimer, the term of this patent is extended or adjusted under 35 U.S.C. 154(b) by 153 days.

(21) Appl. No.: 16/057,408

(22) Filed: Aug. 7, 2018

(65) Prior Publication Data

US 2018/0365498 A1 Dec. 20, 2018

Related U.S. Application Data

(62) Division of application No. 15/092,548, filed on Apr. 6, 2016, now Pat. No. 10,074,014.

(Continued)

(51) Int. Cl.
*G06K 9/00* (2006.01)
*G06F 16/48* (2019.01)
(Continued)

(52) U.S. Cl.
CPC ......... *G06K 9/00765* (2013.01); *G06F 16/48* (2019.01); *G06K 9/0014* (2013.01);
(Continued)

(58) Field of Classification Search
CPC combination set(s) only.
See application file for complete search history.

(56) References Cited

U.S. PATENT DOCUMENTS

| 8,306,124 B2 | 11/2012 | Gao et al. |
| 10,074,014 B2 * | 9/2018 | Teuton ............... H04N 19/25 |

(Continued)

OTHER PUBLICATIONS

"Linear Predictive Coding", https://en.wikipedia.org/wiki/Linear_predictive_coding?oldid=687498962, 3 pages (visited Feb. 23, 2016).

(Continued)

*Primary Examiner* — Alex Kok S Liew
(74) *Attorney, Agent, or Firm* — Klarquist Sparkman, LLP

(57) ABSTRACT

Innovations in the identification or classification of features in a data set are described, such as a data set representing measurements taken by a scientific instrument. For example, a task-specific processing component, such as a video encoder, is used to generate task-specific metadata. When the data set includes video frames, metadata can include information regarding motion of image elements between frames, or other differences between frames. A feature of the data set, such as an event, can be identified or classified based on the metadata. For example, an event can be identified when metadata for one or more elements of the data set exceed one or more threshold values. When the feature is identified or classified, an output, such as a display or notification, can be generated. Although the metadata may be useable to generate a task-specific output, such as compressed video data, the identifying or classifying is not used solely in production of, or the creation of an association with, the task-specific output.

20 Claims, 18 Drawing Sheets

Related U.S. Application Data

(60) Provisional application No. 62/151,275, filed on Apr. 22, 2015.

(51) Int. Cl.
  H04N 19/46 (2014.01)
  H04N 19/25 (2014.01)

(52) U.S. Cl.
  CPC .............. *H04N 19/25* (2014.11); *H04N 19/46* (2014.11); *G06K 2009/00738* (2013.01); *G06K 2209/27* (2013.01); *G06K 2209/403* (2013.01)

(56) References Cited

U.S. PATENT DOCUMENTS

| | | | |
|---|---|---|---|
| 2003/0210821 | A1 | 11/2003 | Yogeshwar et al. |
| 2006/0039617 | A1 | 2/2006 | Makai et al. |
| 2008/0144895 | A1* | 6/2008 | Hunter ............... G06K 9/00127 382/128 |
| 2008/0212866 | A1* | 9/2008 | Lett ..................... G06F 3/04847 382/133 |
| 2012/0286046 | A1* | 11/2012 | Ciurczak ................ B65D 23/14 235/454 |
| 2014/0376624 | A1 | 12/2014 | Li et al. |
| 2015/0055855 | A1* | 2/2015 | Rodriguez ........... G06K 9/6259 382/159 |

OTHER PUBLICATIONS

Altarawneh, et al. "Data Compression Techniques on Text Files: A Comparison Study", International Journal of Computer Applications (0975-8887), vol. 26—No. 5, 13 pages (2011).
Bradbury, J., "Linear Predictive Coding", 23 pages (Dec. 5, 2000).
Calic, et al., "Efficient Key-Frame Extraction and Video Analysis", in Proceedings, International Conference on Information Technology: Coding and Computing, Apr. 8-10, 2002 (2002).
Cao, Yu, "AVIDENSE: Advanced Video Analysis System for Colonoscopy Semantics", Retrospective Theses and Dissertations, Iowa State University, 115 pages(2007).
Compression Principles Text and Image, https://fenix.tecnico.ulisboa.pt/downloadFile/3779571976903/licao_4.pdf, 32 pages (visited Feb. 23, 2016).
Cotsaces, et al., "Video Shot Detection and Condensed Representation: A Review", Signal Processing Magazine, IEEE, 23(2): p. 28-37 (2006).
Draft Recommendation ITU-T H.262, http://cutebugs.net/files/mpeg-drafts/is138182.pdf, 255 pages (1995, visited Feb. 8, 2016)).
ETS Research "Automated Scoring of Writing Quality", downloaded from https://www.ets.org/research/topics/as_nlp/writing_quality, 6 pages (visited on Feb. 23, 2016).
Fernando, et al., "Abrupt and Gradual Scene Transition Detection in MPEG-4 Compressed Video Sequences Using Texture and Macroblock Information", in Image Processing, ICIP '04, International Conference (2004).
FFmpeg, https://www.ffmpeg.org/, 18 pages (visited Mar. 17, 2016).
Gamaz, et al., "Scene Change Detection in MPEG Domain", Image Analysis and Interpretation, IEEE Southwest Symposium (1998).
Gargi, et al., "Performance Characterization of Video-Shot-Change Detection Methods", Circuits and Systems for Video Technology, IEEE Transactions, 10(1): p. 1-13 (2000).
Guo, et al., "Adaptive Motion Vector Resolution with Implicit Signaling", Proceedings of 2010 IEEE 17th International Conference on Image Processing, Sep. 26-29, 2010, Hong Kong, Technicolor Corporate Research, Princeton, NJ, USA, pp. 2057-2060 (2010).
International Organisation for Standardisation Organisation Internationale De Normalisation ISO/IEC JTC1/SC29/WG11 Coding of Moving Pictures and Associated Audio, Information Technology—Generic Coding of Moving Pictures and Associated Audio, Draft International Standard, ITU-T Draft Rec. H.262, 212 pages (1994).
International Standard, "Information Technology—Generic Coding of Moving Pictures and Associated Audio Information: Systems", 171 pages, Second Edition (2000).
Le Gall, D., "MPEG: A Video Compression Standard for Multimedia Applications", Communications of the ACM, 34(4): p. 46-58 (1991).
Lefèvre, et al., "Efficient and Robust Shot Change Detection", Journal of Real-Time Image Processing, 2(1): p. 23-34 (2007).
Lelescu, et al., "Statistical Sequential Analysis for Real-Time Video Scene Change Detection on Compressed Multimedia Bitstream", Multimedia, IEEE Transactions, 5(1): p. 106-117 (2003).
Lian, S., "Automatic Video Temporal Segmentation Based on Multiple Features", Soft Computing, 15(3): p. 469-482 (2011).
Lienhart, R., "Comparison of Automatic Shot Boundary Detection Algorithms", SPIE Conference on Storage and Retrieval for Image and Video Databases, 3656: p. 290-301 (1999).
Mandal, et al., "A Critical Evaluation of Image and Video Indexing Techniques in the Compressed Domain", Image and Vision Computing, 17(7): p. 513-529 (1999).
Marpe, et al. "The H.264/MPEG4 Advanced Video Coding Standard and its Applications", IEEE Communications Magazine, 10 pages (2006).
Meng, et al., "Scene Change Detection in an MPEG-Compressed Video Sequence", IS&T/SPIE's Symposium on Electronic Imaging: Science & Technology, International Society for Optics and Photonics (1995).
Puri, A, "Video coding using the MPEG-2 compression standard," *Proc. SPIE* 2094, Visual Communications and Image Processing '93, 1701 (Oct. 22, 1993).
Seong-Whan, et al., "Fast Scene Change Detection Using Direct Feature Extraction from MPEG Compressed Videos", Multimedia, IEEE Transactions, 2(4): p. 240-254 (2000).
Sikora, T., MPEG digital video-coding standards. Signal Processing Magazine, IEEE, 14(5): p. 82-100, (1997).
Smeaton, et al., "Video Shot Boundary Detection: Seven Years of TRECVid Activity", Computer Vision and Image Understanding, 114(4): p. 411-418 (2010).
SMPTE Standard VC-1 "Compressed Video Bitstream Format and Decoding Process", The Society of Motion Picture and Television Engineers, 493 pages (2006).
Sun, Z., et al., "A Motion Location Based Video Watermarking Scheme Using ICS to Extract Dynamic Frames", Neural Computing and Applications, 18(5): p. 507-514 (2009).
Teuton, et al., "Analysis of Streaming Data Using Compression Algorithm Metadata", CoDa 2016, Mar. 2-4, 2016, Santa Fe, NM, 1 page (2016).
Teuton, et al., "Compression Algorithm Analysis of In-Situ (S)TEM Video: Towards Automatic Event Detection and Characterization", Microscopy and Microanalysis, 21, Suppl. 3: 2329-2330 (Sep. 2015).
Teuton, et al., "Compression Algorithm Analysis of In-Situ (S)TEM Video: Towards Automatic Event Detection and Characterization", Analysis in Motion Initiative : Compression Statistics for Analysis of Streaming Data, Microscopy and Microanalysis 2015, Aug. 2-6, 2015, Portland, OR, 14 pages (2015).
Teuton, J., "Analysis in Motion—Compression Statistics for Analysis of Streaming Data",NNL, US Dept. of Energy, 2 pages (Sep. 2014).
Yuan, et al., "A Formal Study of Shot Boundary Detection", Circuits and Systems for Video Technology, IEEE Transactions, 17(2): p. 168-186 (2007).

\* cited by examiner

FEATURE IDENTIFICATION OR CLASSIFICATION USING TASK-SPECIFIC METADATA

CROSS REFERENCE TO RELATED APPLICATION

This application is a divisional application of, and incorporates by reference, U.S. patent application Ser. No. 15/092,548, filed Apr. 6, 2016, which in turn claims the benefit of, and incorporates by reference, U.S. Provisional Patent Application Ser. No. 62/151,275, filed Apr. 22, 2015.

ACKNOWLEDGMENT OF GOVERNMENT SUPPORT

This invention was made with government support under Contract DE-AC05-76RL01830, awarded by the U.S. Department of Energy. The government has certain rights in the invention.

FIELD

The present disclosure relates to computer systems that facilitate identification and/or classification of features of a data set, such as a data set that represents measurements taken by a scientific instrument, using metadata generated by a task-specific processing component. Particular embodiments relate to computer systems that facilitate identification and/or classification of features of measurements taken by a scientific instrument by using metadata generated by a video encoder.

BACKGROUND

Technological improvements in hardware and computing power can allow for increasing amounts of data to be obtained. For example, improvements in technology can allow larger amounts of measurements to be captured by a nuclear magnetic resonance spectrometer, scanning transmission electron microscope, or other scientific instrument, providing higher resolution for features, such as events, that might be represented in the data. However, the increased amount of data available can be difficult to analyze using typical methods, such as manual review of acquired data.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the present disclosure provides a computer system providing a feature identification or classification tool for analyzing measurements taken by a scientific instrument. The computer system includes a video encoder configured to perform operations associated with video encoding. The computer system also includes a metadata capture component configured to capture metadata generated by the video encoder, and a metadata analysis component configured to facilitate identification or classification of a feature of the measurements taken by the scientific instrument. The computer system is configured to perform operations that include receiving, at the video encoder, source video data that includes frames, with at least one of the frames depicting, or associated with, the feature of the measurements taken by the scientific instrument. The operations include performing operations associated with video encoding on the source video data to produce video encoder metadata.

In general, the video encoder metadata indicates decisions or observations made by the video encoder for production of encoded video data. In some implementations, the video encoder metadata is itself useable in the production of encoded video data. At least a portion of the video encoder metadata is captured with the metadata capture component, so as to produce captured metadata. With the metadata capture component, the captured metadata is provided to the metadata analysis component to facilitate identification or classification, based on the captured metadata, of the feature of the measurements taken by the scientific instrument. For example, the metadata capture component renders the captured metadata for display, to facilitate manual identification or classification of the feature of the measurements taken by the scientific instrument. Or, based on the captured metadata, the feature of the source video data is identified or classified with the metadata analysis component.

In another embodiment, the present disclosure provides a method for identifying or classifying a feature of a data set. The method can be carried out, at least in part, with a computer system that implements a task-specific processing component and a metadata capture component. A data set is received. The data set includes data associated with the feature. The task-specific processing component processes the data set to generate task-specific metadata. In general, the task-specific metadata indicates decisions or observations made by the task-specific processing component for production of a task-specific output. In some implementations, the task-specific metadata is useable in the production of the task-specific output. With a metadata capture component, at least a portion of the task-specific metadata is captured to produce captured metadata. The feature is identified or classified based on analysis of the captured task-specific metadata. Even when the task-specific metadata is useable in the production of a task-specific output, the identifying or classifying is not used solely in the production of, or the creation of an association with, the task-specific output.

The present disclosure, in a further embodiment, provides one or more computer-readable media storing computer-executable instructions for causing a computer programmed with the instructions to perform operations for task-specific processing and metadata capture. The operations include receiving measurements recorded by an instrument, with the measurements being in a first format unusable by a task-specific processing component. The operations further include converting the measurements to a data set in a second format useable by the task-specific processing component. The operations also include processing the data set. The data set includes data associated with the feature of the measurements. The data set is processed with a task-specific processing component to generate task-specific metadata. In general, the task-specific metadata indicates decisions or observations made by the task-specific processing component for production of a task-specific output. In some implementations, the task-specific metadata is useable in the production of the task-specific output. At least a portion of the task-specific metadata is captured to provide captured metadata. The feature can be identified or classified based on analysis of the captured task-specific metadata.

The foregoing and other objects, features, and advantages of the present disclosure will become more apparent from the following detailed description, which proceeds with reference to the accompanying figures.

BRIEF DESCRIPTION OF THE DRAWINGS

Various embodiments are shown and described in connection with the following drawings in which.

DETAILED DESCRIPTION

Figure 1:
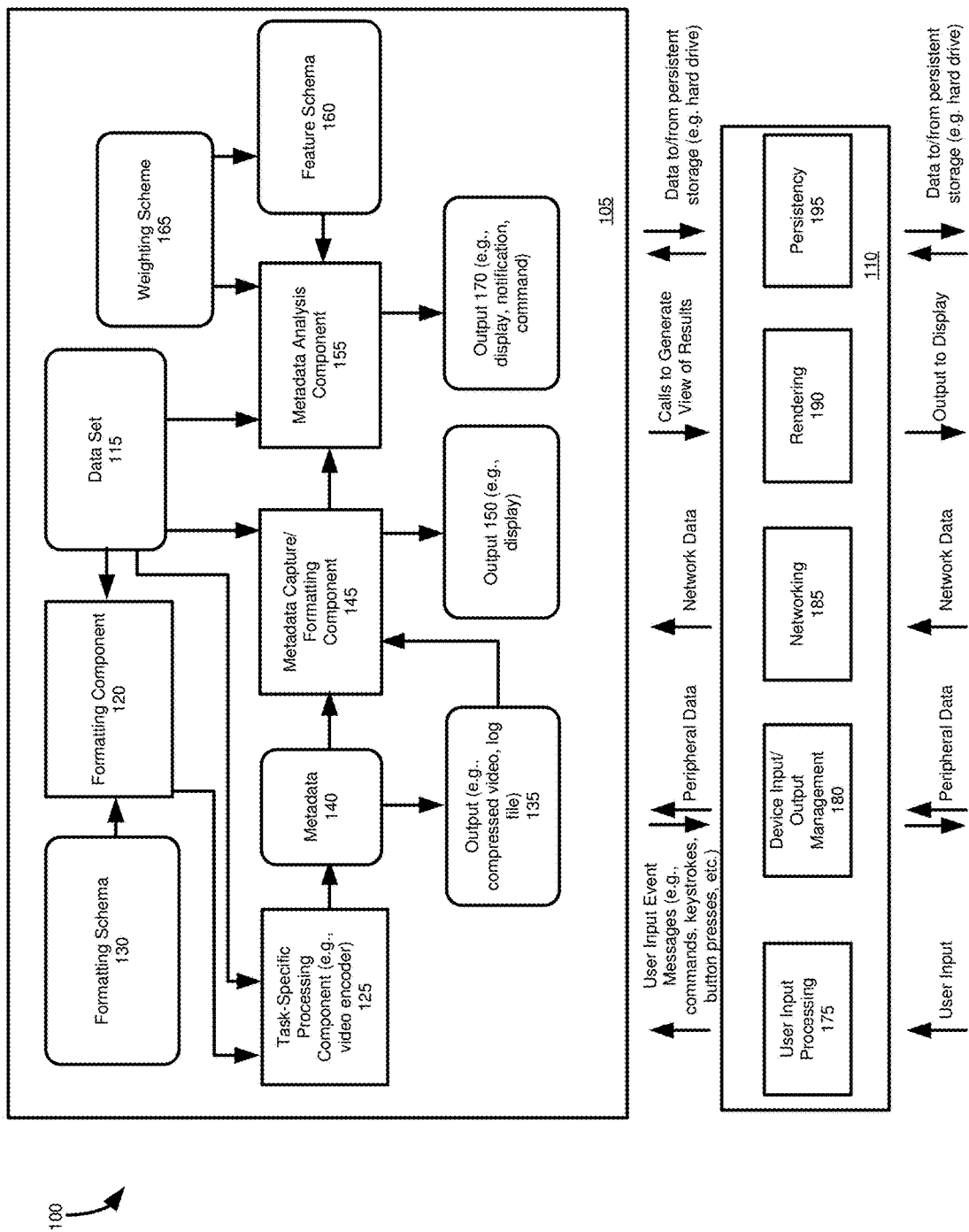
FIG. 1 is a block diagram illustrating an example software environment in which a feature identification/classification component may employ a task-specific processing component and a metadata capture component to aid in the identification or classification of a feature associated with a data set, such as a data set representing measurements taken by a scientific instrument.

Unless otherwise explained, all technical and scientific terms used herein have the same meaning as commonly understood by one of ordinary skill in the art to which this disclosure pertains. The singular terms "a," "an," and "the" include plural referents unless the context clearly indicates otherwise. Similarly, the word "or" is intended to include "and" unless the context clearly indicates otherwise. The term "includes" means "comprises."

Depending on context, a given component or module may accept a different type of information as input and/or produce a different type of information as output. More generally, various alternatives to the examples described herein are possible. For example, some of the methods described herein can be altered by changing the ordering of the method acts described, or by splitting, repeating, or omitting certain method acts. The various aspects of the disclosed technology can be used in combination or separately. Different embodiments can use one or more of the described innovations.

The present disclosure describes innovations in detecting and/or identifying a feature of a data set, such as a data set that represents measurements of an instrument. In at least certain examples, the instrument is a scientific instrument. An instrument can be an apparatus configured to facilitate a particular purpose or activity, and that generates information in doing so. For example, a camera can be used to obtain information representing a view of a subject. A multimeter can be used to measure features such as voltage, current, and resistance, such as in an electrical circuit, which can provide information about the components in, or functioning of, the circuit.

A scientific instrument can be an instrument used to facilitate scientific investigation, which can involve studying a particular subject or phenomenon to investigate a hypothesis (e.g., the conduction of an experiment) or otherwise advance the study of the subject or phenomenon. In at least some cases, a scientific instrument can be used under controlled conditions. A particular instrument may be useable as both an instrument and a scientific instrument. For example, a camera can be used to record visual information regarding a variety of subjects. When used as a scientific instrument, the camera may be used to record visual information associated with the systematic study of a particular physical or natural process, such as images of crystal growth.

The data set can be, for example, video data, a set of discrete images, audio data, waveforms, or textual data, such as a writing sample. A feature can include an event depicted in the data set, such as an event that has occurred, or will or may occur in the future. A feature can include additional or other types of information about the data set. For example, when the data set includes text, the feature can be a change in authorship between portions of the text, or information about the author, such as whether the author is a native speaker of the language in which the text was written.

When the data set, such as a data set representing measurements, includes video or images, an event may be a change in a subject (including an object) depicted in the video/images. In another implementation, the event can indicate a change in a subject associated with the data set. For example, the data set may include images of waveforms associated with a chemical reaction or process. A change in the waveform images can indicate a change in the reaction or process.

The feature can be identified (e.g., the detection that a feature has occurred or is present) or classified (e.g., the feature type or nature is identified) based upon metadata, such as task-specific metadata, generated by a task-specific processing component. In some implementations, a task-specific processing component is a processing component that is highly optimized for a specific purpose, such as generating a particular output. For example, video encoders are typically configured to analyze video data and compress the video data by encoding it, so as to produce encoded video data that requires less space to store or fewer bits to transmit. The metadata can reflect analysis or calculations performed by the task-specific processing component.

In general, task-specific metadata indicates decisions or observations made by the task-specific processing component. Task-specific metadata can include metadata that is itself useable in generating a particular output. For example, a video encoder can be configured to exploit redundancies in video data, such as a portion of an image that remains unchanged over multiple frames, or portions of an image that appear in more than one frame, but whose positions are spatially offset between frames. Metadata regarding differences between frames can be task-specific metadata useable in the production of encoded video. For textual data, the output can be a score assigned by an automated essay grader. Task-specific metadata useable in assigning the score can include metadata related to word choice, sentence length or structure, and grammar. In at least some cases, task-specific metadata does not include non-task-specific metadata, such as general-purpose metadata regarding information such as a file name, a date a data set was acquired, accessed, or modified, a file size, or an identify of a user who created the data set.

Metadata values, or changes in metadata values, including task-specific metadata values, can be used to identify or classify a feature in the data set. For example, changes in task-specific metadata generated by a video encoder can indicate that a visual change has occurred between frames, which in turn can reflect the occurrence of an event, such as an event in measurements taken by a scientific instrument, and, in some examples, the nature of the event.

The disclosed innovations can reduce or eliminate the need for manual review of the data set to identify or classify a feature, such as a feature of measurements taken by a scientific instrument. For example, images or other data may be recorded over a long period. Finding and determining the nature of a feature manually can involve manual review of thousands or more individual images. Using metadata generated by a task-specific processing component can facilitate or automate the review or identification/classification processes, potentially making the identification or classification more accurate or precise, or enabling an identification or classification that would be difficult or impossible to carry out manually using the raw data set.

Example 1—Feature Identification/Classification Using Task-Specific Processing Component FIG. 1 illustrates an example software environment 100 that can be used to implement a feature detection/classification component 105 that can work with an operating system ("OS") 110 to detect or classify a feature of a data set 115, such as a data set that represents measurements taken by an instrument, such as a scientific instrument. The software environment 100 can be implemented in any suitable computing device, such as a desktop computer, laptop computer, netbook, workstation, tablet-computing device, or smartphone (or similar mobile computing device).

The data set 115 can include data from one or more of a variety of sources. The data set 115 can include data types such as image data (video having a series of frames, or a set of discrete images), audio data, textual data (such as writing samples), numerical data (such as the output of a scientific instrument or computing device or process), or any other data that can be provided in computer-readable form. For example, the data set 115 can include video data, such as video data that includes image data depicting, or associated with, a feature.

In some cases, the data set 115, such as video data, can depict a subject, which can be one or more living, inanimate, or virtual (such as computer-generated) subjects, over a time period. In other cases, the data set 115, such as video data, can represent other information associated with the subject. For example, video data can depict information (such as a feature) associated with a subject, but need not depict the subject itself.

As an example, a subject can be a chemical reaction or process, such as crystal growth. Image data, such as scanning transmission electron microscope (STEM) images, can illustrate various stages of crystal growth. The STEM images (either as a set of discrete images or formatted as video data having a series of frames) can be used as the data set 115. Changes between STEM images can represent a change in the stage of crystal growth. For the same reaction or process, other data, such as nuclear magnetic resonance spectroscopy (NMR) data, or data representing measurements taken by other types of scientific instruments, can serve as the data set 115 (either as a set of discrete images or formatted as video data). Changes in the appearance of the NMR spectra can represent events occurring during the chemical reaction or process, while not directly depicting the chemical reaction or process.

The feature detection/classification component 105 can include a formatting component 120. The formatting component 120 can format the data set 115 to be useable by a task-specific processing component 125, or to improve the results or operation of the feature detection/classification component 105. In other cases, the formatting component 120 can be omitted, and the data set 115 directly used by the task-specific processing component 125.

In one implementation, the formatting component 120 can convert elements of the data set 115 from a first format to a second format. For example, the formatting component 120 can convert a set of still images into a video format useable by the task-specific processing component 125. The formatting component 120 may be configured to convert video data from a first video format to a second video format, such as from the MPEG-2 standard to the MPEG-4 standard. In another example, the formatting component 120 can convert a numerical data set 115 into a visual representation of the numerical data set 115, such as taking numerical information (for instance, formatted numerical values provided in a comma separated values file format for a time series) and generating a visual representation (such as a plot) of the numerical data set 115.

The formatting component 120 can also adjust the format of the data set 115, such as to a form useable by the task-specific processing component 125, or to improve the results of the event detection/classification component 105. As an example, the data set 115 can include a set of images, either as multiple discrete images or as a series of video frames. Although the images may all depict, or be associated with, the same subject, they may do so in an inconsistent manner. For example, the visual representation of a feature of interest in the images may spatially differ between the images in a way that results from the formatting of the data set 115 rather than from an underlying feature of the subject. Adjusting the format of video images can include operations such as resizing (such as enlarging or reducing), reorienting (such as rotating), cropping, or stabilizing (such as realigning) the images The adjustment may be carried out, for example, using one or more reference points present in multiple images of the data set 115.

For other data types, different types of formatting may be carried out by the formatting component 120. For a data set 115 that includes textual data, the formatting component 120 can, for example, select appropriate starting and ending points of the textual data, or otherwise determine one or more portions of the textual data to be provided to the task-specific processing component 125. Formatting textual data can also include operations such as converting the textual data between different file formats or adjusting textual elements such as the font, line spacing, indentions, etc. of the text.

Similarly, for numerical data, in a time series or otherwise, the formatting component 120 can carry out operations such as selecting appropriate starting and ending points, or otherwise determine one or more portions of the numerical data to be provided to the task-specific processing component 125. The formatting component 120 can also carry out operations such as converting numerical values associated with a first unit (e.g., a unit of length, mass, time, frequency, energy, etc.) to another unit, extracting a portion of the numerical values in the data set 115 for analysis by the task-specific processing component 125, or altering the arrangement of the data set 115 (e.g., converting the numerical values between different file formats). For example, sample values in a time series can be converted to sample values of an image, placing the sample values of the time series from left to right across a row of the image, and repeating row-after-row from the top of the image to the bottom of the image.

The operations carried out by the formatting component 120 can be specified by one or more formatting schema 130. In some cases, the formatting component 120 can determine one or more data types present in the data set 115 and select one or more appropriate formatting schema 130 to apply to the data set 115. For example, a given one of the formatting schema 130 can specify formatting operations when converting from a specific input data type or format into a specific output data type or format (e.g., time series of 16-bit sample values to video images with three 8-bit sample values per position, set of images with 24-bit sample values to video images with 24-bit sample values). In other cases, the formatting component 120 can determine that the data set 115 need not be formatted, and can pass the data set 115 to the task-specific processing component 125, or indicate to the feature detection/classification component 105 that the data set 115 may be used directly by the task-specific processing component 125.

The task-specific processing component 125 is typically a component that is highly optimized to carry out a specific task, or a limited number of related tasks. The task-specific processing component 125 can apply one or more algorithms or methods to the data set 115, which can be a data set 115 directly received by the task-specific processing component 125 or a data set 115 received from the formatting component 120, and which can be a formatted or unformatted data set 115.

The task-specific processing component 125 can, in some implementations, produce an output 135. The output 135 can be an output that the task-specific processing component 125 was configured and optimized to produce. The output 135 can be a final output of the task-specific processing component 125 or can represent an intermediate output (e.g., a log file). When the output 135 is an intermediate output, the task specific 125 processing component can, in some implementations, also produce a final output. In other implementations, the task-specific processing component 125 need not produce, or be capable of producing, a final output, an intermediate output, or any output 135.

The task-specific processing component 125 can produce metadata 140, including task-specific metadata. In general, the task-specific metadata indicates decisions or observations made by the task-specific processing component 125 for production of a task-specific output. In at least some implementations, metadata 140 can describe the data set 115, the output 135, and in at least some implementations, metadata 140 can describe or be used to guide the production of the output 135 from the data set 115, including in implementations where an output 135 is not generated. Metadata 140 can include data produced during the operation of the task-specific processing component 125 that need not be present in, or determinable from, an output 135, such as an intermediate output or a final output. Metadata 140 can also be, or include, metadata 140 in, or determinable from, the output 135. In a further implementation, the task-specific processing component 125 need not produce metadata 140 apart from metadata present in, or determinable from, the output 135.

As an illustrative example, which will be further discussed in Example 2, consider a feature detection/classification component 105 in which the task-specific processing component 125 is a video encoder configured to generate encoded (compressed) video data using a compression or encoding process (which can be lossless or lossy). A final output 135 of the task-specific processing component 125 can be encoded video, such as a compressed video stream or a compressed video file.

In a two-pass video encoder, a first pass carried out by the video encoder can generate an intermediate output, such as represented in a log file. The log file can include metadata 140, such as metadata 140 related to visually perceptible changes occurring between frames of the data set 115. In other cases, the metadata 140 can be obtained from the video encoder without the generation of a log file or other output 135. In a second pass, the two-pass video encoder can use the metadata 140, including metadata 140 in, or determinable from, the log file to generate a final output 135, such as a compressed video stream or file. The final output 135, such as the compressed video stream or file, may also include, or have syntax elements that can be used to derive, at least a portion of the metadata 140 produced during the encoding process (including metadata 140 associated with a first or a second pass).

In another illustrative example, the data set 115 can include textual data. The task-specific processing component 125 can include an algorithm suitable for text compression, or a writing analysis algorithm, such as a natural language processing algorithm. In a particular example, the writing analysis algorithm includes an automated essay-scoring algorithm.

In the case of text compression, the output 135 can be compressed text, such as a file storing compressed text. Metadata 140 produced during the compression process can include the frequency of various characters or words appearing in the text. In the case of natural language processing, the output 135 can be, for example, a score related to the writing quality of the text in the data set 115. Metadata 140 produced during the natural language processing can include features such as word use and selection (including word variety and sophistication), grammatical errors, punctuation or capitalization errors, sentence length and variety, and information related to the overall structure of the text, such as paragraph structuring and the statement and development of a thesis.

For audio compression, the output 135 can be compressed audio data, such as a compressed audio data stream or a compressed audio file. The metadata 140 can include decisions or observations made during the compression process (which can be lossless or lossy). The audio metadata 140 can include information relating to patterns present in a source data set 115, such as coding of the data, patterns associated with the data, or metadata 140 generated during linear predictive coding.

Although a task-specific processing component 125 may typically be optimized for a single task, or a limited number of related tasks, such as to generate the output 135, it should be appreciated that the data set 115 need not be, or include, data typically used by the task-specific processing component 125. Similarly, the output 135, if any, may not be of interest or otherwise used by the feature detection/classification component 105, other than for any metadata 140 that may be present in, or determinable from, the output 135.

For example, a data set 115 can include waveforms obtained from a scientific instrument, and the task-specific processing component 125 can include an audio encoder. The audio encoder 125 can operate on the waveforms to produce separate metadata 140 and/or an output 135, including an output 135 that includes at least some of the metadata 140. However, the waveforms of the data set 115 are not the type of data normally used with an audio encoder (which typically receives a source audio stream that represents speech, music, or other captured sounds). Similarly, the output 135 (a compressed audio file produced using the waveforms) may not be a desired or used result of the audio encoder (other than for any metadata 140 that might be contained in, or determinable from, the compressed audio data).

A similar situation can result using a video encoder as the task-specific processing component 125. A series waveform images representing measurements obtained from a scientific instrument can be used as a data set 115 and provided to the video encoder. The video encoder can produce metadata 140. However, an encoded video output 135 may not be of particular use or interest.

The separate metadata 140, or the output 135 or metadata 140 associated with the output 135, can be provided to a metadata capture/formatting component 145. The metadata capture/formatting component 145 can be used to capture metadata 140 of interest from the task-specific processing component 125, from the output 135 of the task-specific processing component 125, from metadata 140 associated with the output 135 of the task-specific processing component, or a combination thereof. In one implementation, the metadata capture/formatting component 145 can interface with the task-specific processing component 125, such as to capture metadata 140 generated by the task-specific processing component 125.

When the task-specific processing component 125 generates an output 135, the metadata capture/formatting component 145 can parse the output 135, such as a log file generated by the task-specific processing component 125, to capture and format metadata 140 of interest. Or, as another example, a metadata capture/formatting component 145 can analyze an output 135 that includes compressed video data produced by a task-specific processing component 125 that includes a video encoder in order to determine metadata 140 generated by the video encoder. In a particular example, the metadata capture/formatting component 145 can analyze the bit stream of the encoded video data output 135 to capture metadata 140 of interest.

The metadata capture/formatting component 145 can format metadata 140, such as into a format suitable for generating an output 150. The output 150 can be, for example, a display of one or more types and values of various metadata 140, such as types and values over a period of time, or over a range of elements of the data set 115.

In at least certain implementations, the metadata 140 can be associated with data elements of the data set 115. For example, the metadata capture/formatting component 145 can generate a display, or other output 150, that associates one or more metadata types and values with a corresponding data element of the data set 115. A user, such as through the operating system 110 and the metadata analysis component 155, may interact with the output 150, such as to select which metadata types to view and whether to view metadata values for an entire data set 115 or selected elements of the data set 115.

In a particular implementation, a user may manually identify or classify a feature in the data set 115 by viewing metadata values for one or more metadata types over a period of time or range of elements of the data set 115. In addition to the captured metadata 140, the output 150 of the metadata capture/formatting component 145, such as a display, can include one or more elements of the data set 115. For example, a metadata value of interest can be associated with a corresponding element of the data set 115, such as a particular image of an image data set, a portion of an audio data set, or a selection of textual data. The corresponding element of the data set 115 can be displayed or otherwise presented to the user, which can aid the user in identifying or classifying a feature associated with the metadata value, and a corresponding data element of interest.

In further implementations, the output 150 is, or includes, output other than a display. For example, the output 150 can include a log file or other record of the output 150, which can also include corresponding elements of the data set 115, or information sufficient to identify corresponding elements of the data set 115. In some aspects, the metadata capture/formatting component 145 need not generate an output 150.

The metadata capture/formatting component can provide captured or formatted metadata to a metadata analysis component 155. Although not illustrated in FIG. 1, in at least some cases, the metadata analysis component 155 can receive separate metadata 140, an output 135, metadata 140 associated with the output 135, or the data set 115 (including elements thereof) in place of, or in addition to, receiving captured metadata from the metadata capture/formatting component 145.

For example, the metadata analysis component 155 can receive the data set 115, or elements thereof, directly, through the metadata capture/formatting component 145, or through another component of the software environment 100. Similarly, the metadata analysis component 155 can directly receive the metadata 140 from the task-specific processing component 125, or through another component of the software environment 100. The metadata analysis component 155 may directly access the output 135, or can access the output 135 through another component of the software environment 100. Accordingly, in at least some implementations, the metadata capture/formatting component 145 can be omitted (or combined with the metadata analysis component 155). In further implementations, the metadata analysis component 155 can be omitted, such as when the metadata capture/formatting component 145 generates a display of captured or formatted metadata 140 for viewing by a user, who can then identify or classify a feature of the data set 115 using the metadata 140.

The metadata analysis component 155 can be configured to analyze the metadata 140, the output 135, formatted metadata 140 from the metadata capture/formatting component 145, and/or the data set 115 to detect or classify an event in the subject represented by, or associated with, the data set 115. For example, the metadata analysis component 155 can associate separate metadata 140 (or metadata 140 in the output 135), or the results of analyzing the metadata 140 or the output 135 using the metadata analysis component 155, with elements of the data set 115.

The metadata analysis component 155 can receive a feature schema 160. The feature schema 160 can be used to specify how the metadata 140, the output 135, or the analysis of the metadata 140 or the output 135 can be used to identify or classify a feature of the data set 115. The metadata analysis component 155 can receive a weighting scheme 165. The weighting scheme 165 can assist the metadata analysis component 155 in identifying or classifying a feature by assigning higher weights aspects of the metadata 140 that are likely more probative of the feature, components of the output 135, or the results of analyzing the metadata 140 or output 135 using the metadata analysis component 155. The weighting scheme 165, in some implementations, can be included in the feature schema 160.

In at least some implementations, the metadata analysis component 155 can identify or classify a feature in a subject depicted by, or associated with, the data set 115 by detecting particular values, or variations in values, of one or more types of metadata 140, including metadata 140 associated with the output 135. For example, a feature may be identified or classified by values of one or more metadata types exceeding a certain value, being below a certain value, or meeting or maintaining a certain value for a threshold period of time. In further examples, a change in the pattern of the values of one or more metadata types may be used by the metadata analysis component 155 to identify or classify a feature. For example, a change between a period of comparatively high variation in the values of one or more metadata types to a period of comparatively low variation can indicate the presence, as well as the nature, of a feature. Similarly, a change to a period of comparatively high variation from a period of comparatively low variation can indicate the presence, as well as the nature, of a feature.

As described above, the criteria for identifying a feature, and optionally classifying a feature, can be provided by the feature schema 160. The feature identification/classification component 105 can include multiple feature schema 160, including different feature schema 160 for different types of data sets 115, or multiple feature schema 160 for a particular type of data set 115. For example, feature schema 160 may define multiple types of features that might be present in the data set 115, and which can potentially be identified or classified using the metadata analysis component 155.

As an example, in the case of a data set 115 that includes video data, a task-specific processing component 125 can include a video encoder, which can generate metadata 140 (at least some of which can be included in an output 135, such as a compressed video data, or provided as separate metadata 140). At least a portion of the metadata 140 can relate to changes between frames of the video data. A switch from a period of comparatively high variation between frames to a period of comparatively low variation, or vice-versa, can indicate the occurrence of an event. For example, in the case of crystal growth, a change from low variation to high variation can indicate that a crystal is actively growing, while a change from high variation to low variation, or a prolonged period of low variation, can indicate the absence of crystal growth. In the example of a data set 115 including NMR spectra, a change from high variation in the spectra to low variation, or a prolonged period of low variation, can indicate that a chemical reaction or process has completed, or that further data acquisition is unlikely improve the quality of the data set 115. The types of metadata 140 involved in the identification of the feature, as well as their values, may also be used to classify the feature, including determining a plurality of candidate feature types or eliminating one or more feature types as candidate feature types.

In the example discussed above where a textual data set 115 is provided to a task-specific processing component 125 that includes a text compressor or a natural language processor, a change in metadata 140 that includes compression statistics or linguistic statistics can be used to identify or classify a feature in the data set 115. For example, compression statistics may identify a change in writing style that may indicate that a change in the authorship of the text has occurred, which can, for example, be used to detect plagiarism. Compression statistics may also differ depending on whether the language in which the text was written is a native language of the author. For example, non-native speakers may use shorter words or use a smaller variety of words, or otherwise have different word use patterns, than native speakers. Similarly, changes in linguistic statistics metadata 140 from a natural language processor can be used to identify changes in authorship, or whether the author is a native or non-native speaker of the language.

In some cases, the metadata analysis component 155 can be, or can include, a machine learning software component. The machine learning software component can employ any suitable machine learning technique for the data set 115. Suitable machine learning techniques can include decision trees, artificial neural networks, instance-based learning, Bayesian methods, reinforcement learning, inductive logic programming, genetic algorithms, support vector machines, or combinations thereof.

The metadata analysis component 155 can generate one or more outputs 170. The output 170 can include a display, such as a display of the results of the metadata analysis component 155, or a summary of the results. The display may also include an indication of a feature, including one or more proposed classifications of the feature, and may include one or more elements of the data set 115. For example, the display may provide an indication of an event and an image or text selection from the data set 115 corresponding to the event.

The output 170 can include a command for an action to be taken, such as the issuance of an alert or other notification, or a command to start or stop some action. For example, as described above, the data set 115 can include NMR spectra. If the metadata analysis component 155 determines that the NMR spectra are no longer changing significantly, it can issue a command to stop further data acquisition and/or issue a notification, such as to a user, suggesting that data acquisition be discontinued. In another example, a change in NMR spectra can indicate that an event has occurred and a different action should be taken, such as obtaining one or more STEM images. If the metadata analysis component 155 determines that the event has occurred, it can issue a command to start STEM image acquisition and/or issue a notification, such as to a user, suggesting the STEM image acquisition be initiated.

The feature detection/classification component 105 can use the services of the operating system 110. The operating system 110 can include a user input component 175 for receiving and managing user input. For example, the operating system 110 can receive various types of user input, such as input through keys, buttons, pointer input (such as using a mouse, trackball, or track pad), or input through voice commands or through a touchscreen (such as taps or finger gestures). The user input component 175 can create data that can be received and used by the feature detection/classification component 105.

The feature detection/classification component 105 may listen for user input data from the user interface component 175 and take appropriate actions. For example, the user input can indicate that the feature detection/classification component 105 should load and analyze a data set 115 or generate or interact with an output 150 (e.g., a display) or an output 170 (e.g., a display). In another aspect, the user interface component 175 can indicate that some action be taken by another component of, or a component in communication with, the operating system 110. For example, the user interface component 175 can receive a command in response to an alert produced as an output 170, such as a command to start or stop data acquisition.

Figure 26:
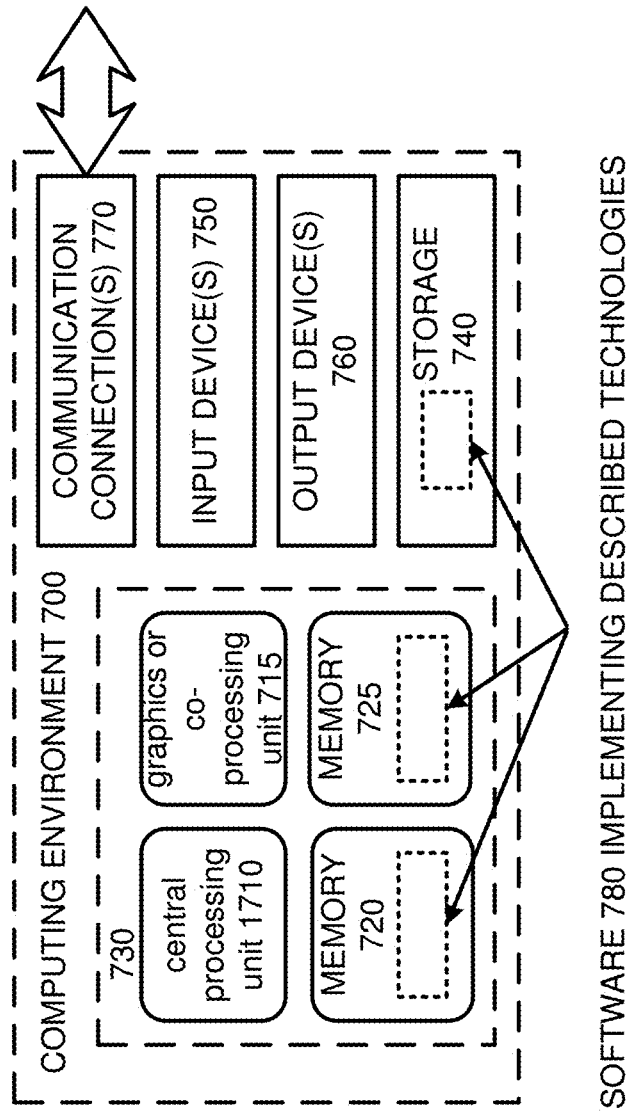
FIG. 26 is a diagram of an example computing system in which described embodiments can be implemented.

A device input/output management component 180 of the operating system 110 can manage the flow of information from devices in communication with the operating system 110 (such as the input device(s) 750 of FIG. 26). For example, the input/output management component 180 can manage the flow of information, such as a flow of information providing a data set 115, such as a data set representing measurements, which can include information from a camera or other image or video source, a scientific instrument, an audio source, a text source, another data source, or a combination thereof. The device/input output component 180 can also interface with devices in order to carry out actions associated with an output 170, such as commands issued to an instrument to start or stop an activity, such as data acquisition.

A networking component 185 of the operating system 110 can manage the flow of data over a network (not shown), including data sent from, and data sent to, the feature detection/classification component 105. In some cases, data is directly conveyed by the networking component 185 to and from the feature detection/analysis component 105. In other cases, the operating system 110 can capture information from data it receives and provide the information to the network or the feature detection/classification component 105. In particular examples, the feature detection/classification component 105 and the operating system 110 are implemented in a computing system that interacts with a mobile computing device, such as a tablet or smartphone, or a source of a data set 115, such as a data set representing measurements, such as a camera or other image or video source, a scientific instrument, an audio source, a text source, another data source, or a combination thereof, over a network.

As used herein, the term "send" to a destination entity refer to any way of transmitting or otherwise conveying data within a computer system or between two computer systems, whether the data is directly conveyed or conveyed through one or more intermediate entities. Similarly, the term "receive," such as to receive from a source entity, refers to the receipt of data within a computer system or between two computer systems, whether the data is received directly from the computer system of original transmission or received through one or more intermediate entities.

A rendering component 190 of the operating system 110 can receive calls from the feature detection/classification component 105 to generate displays associated with the feature detection/classification component 105. For example, the feature detection/classification component 105, through the rendering component 190, may cause a display to present one or more display elements associated with the output 150 or the output 170. The display may be interactive, such that a user can select information to be viewed and cause the feature detection/classification component 105 to take various actions, such as through the user input component 175 of the operating system 110.

A persistency management component 195 of the operating system 110 can manage the flow of information to and from persistent storage, such as a hard drive or other types of non-transitory storage. For example, a user, through the user interface processing component 175, may select a data set 115 to be loaded from persistent storage for analysis using the feature detection/classification component 105 or cause results generated by the feature detection/classification component 105 to be stored in persistent storage.

In some aspects, the feature detection/classification component 105 or operating system 110 can include more or fewer components. In further aspects, the components of the feature detection/classification component 105 or operating system 110 can be arranged differently. For example, components shown may be combined, separated into additional subcomponents, or implemented as part of another component.

Although FIG. 1 shows subcomponents of the feature detection/classification component 105 located in the same physical location as one another, and the operating system 110, in other implementations, one or more of the subcomponents can be located in a different physical location. For example, one or more (including all) of the subcomponents of the feature detection/analysis component 105 can be located on a remote computing system, including a cloud-supported environment, as described with reference to FIG. 27.

Figure 2:
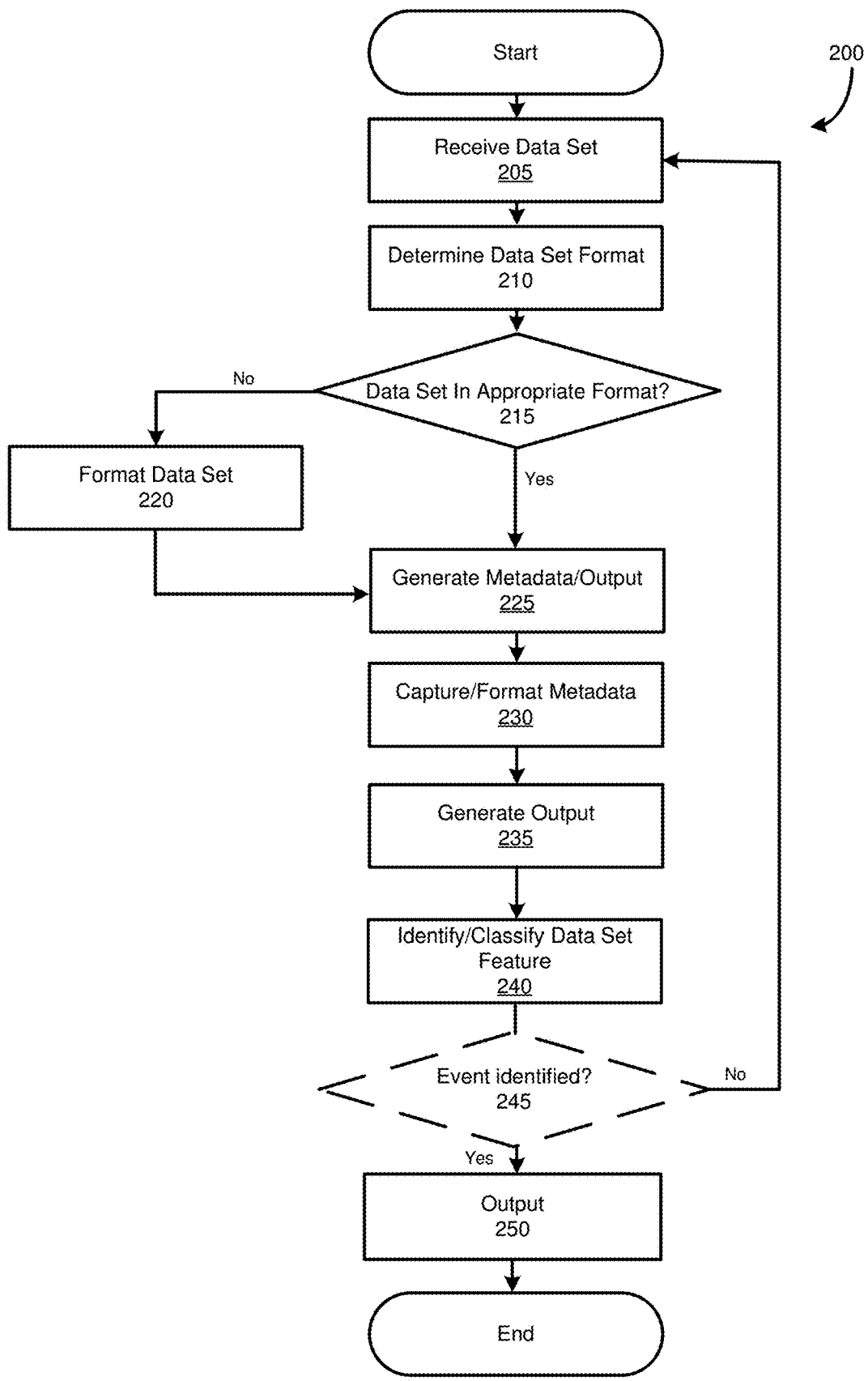
FIG. 2 is a flowchart of a method according to an embodiment of the present disclosure for identifying or classifying a feature of a data set, such as a data set that represents measurements taken by a scientific instrument, using a task-specific processing component and a metadata capture component.

FIG. 2 presents a flowchart of a method 200 according to this Example 1 for identifying or classifying a feature of a data set, such as identifying or classifying an event occurring in the data set. In step 205, a data set is received by a computing system. The data set can, for example, represent measurements taken by an instrument, such as a scientific instrument. The computing system can include a feature recognition/classification component, such as the feature identification/classification component 105 of FIG. 1.

The computing system can determine a data set format in step 210. For example, the data set format can be determined in order to select an appropriate task-specific processing component. In decision 215, the computing system can confirm whether the data set is useable with a particular task-specific processing component, or whether the data set should be reformatted prior to being sent to the task-specific processing component.

If is determined in step 215 that the data set is not in the appropriate format for the task-specific processing component, the data set can be formatted by the computing system in step 220. For example, the data set can be formatted to be useable by a particular task-specific processing component. In some implementations, formatting the data set includes converting the data set from a first format to a second format. In further implementations, formatting the data set includes adjusting the format of the data set. For example, the formatting includes converting non-video measurements recorded by an instrument (e.g., sample values in a time series) into frames of video data. In some cases, one or more, including all, of steps 210, 215, and 220 can be omitted. Also, regardless of format, the data set can be formatted to improve the operation of a particular task-specific processing component.

After receiving the data set in step 205, and optionally carrying out one or more, including all, of steps 210, 215, and 220, a task-specific processing component creates metadata, such as task-specific metadata, and/or an output, in step 225. For example, the task-specific processing component can apply one or more algorithms or methods to the data set, which may involve making calculations or determining values. Task-specific metadata can indicate decisions or observations made by the task-specific processing component for production of a task-specific output. In some implementations, the metadata can describe the output, including a prospective output (such as in implementations where the task-specific processing component does not generate an output, such as an output typically produced by the task-specific processing component, or for which the task-specific processing component was designed). In another implementation, the metadata can describe or be used to guide the production of the output (including a prospective output). In further implementations, the metadata can describe the data set.

The output that may be produced in step 225 can include an output typically produced by the task-specific processing component, or for which the task-specific processing component was designed. For example, when the task-specific processing component is a video encoder, the output can be encoded video data. However, in some cases, the output can include an intermediate output, such data generated by a first pass of a two-pass video encoder. The video encoder can generate metadata, some or all of which may be included in an output, such as encoded video data, or included in a separate file, such as a log file. In various implementations, metadata generated in step 225 can include metadata not included in an output (including an intermediate output) of the task-specific processing component, metadata reflected in an output (including an intermediate output) of the task-specific processing component, metadata in a separate file, or a combination thereof.

In step 230, the computing system captures metadata, such as from the task-specific processing component, an output of the task-specific processing component (including a final output or an intermediate output), or a combination thereof. For example, the computing system parses metadata from a log file or other separate file produced by the task-specific processing component. Or, the computing system parses metadata embedded in a task-specific output. Or, the computing system derives metadata from elements of a task-specific output. Or, the computing system derives metadata from intermediate output of a task-specific processing component (e.g., extracting metadata from intermediate values during processing by the task-specific processing component). In some implementations, step 230 can be omitted.

In optional step 235, the method 200 can generate an output, such as a display of metadata, elements of the data set, or a combination thereof. For example, the display can relate values of one or more metadata types to one or more elements of the data set.

A feature of the data set is identified or classified in step 240. In some cases, the identification or classification can be carried out by a user, such as in response to a display generated in step 235 using captured metadata provided by the computing system to a rendering component such as the rendering component of FIG. 1. In other cases, the identification or classification can be carried out by a computing system, such as a computing system implementing a metadata analysis component 155 as in the feature identification/classification component 105 of FIG. 1. The identification or classification process can include applying a feature schema, such as an event schema, to the metadata captured in step 230. The identification or classification can further include applying a weighting scheme to one or more metadata types captured in step 230, including a weighting scheme specified by a feature schema. In particular implementations, the feature schema and/or weighting scheme are applied by a computing system, such as a computing system implementing the feature detection/classification component 105 of FIG. 1

Although the metadata may be useable in the production of an output, such as a task-specific output, in at least some cases, the identification or classification of a feature based on the metadata is not used solely in the production of, or the creation of an association with, the task-specific output. For example, a video encoder can be used to detect scenes in a video, and include information about the scenes in a menu. However, the identification of the scenes in the video is used to create an association with the compressed video. In other cases, the feature identified or classified is at least not solely the detection of a change in source data. For example, a determination that a scene change has occurred in source video, without more, only indicates a change in the source data, it does not identify or a classify a feature of the subject represented by, or associated with, the source data.

In particular implementations, the method 200 can include a decision 245, where it is determined whether a feature has been identified, such as a predetermined feature. If decision 245 determines that the feature has not been identified, the method 200 can return to step 205 to receive additional data elements for the data set. If the feature has been identified, the method 200 can end. However, the method 200 can be carried out in a different manner. For example, after a feature has been identified, the method 200 can continue by returning to step 205 to receive additional data elements of the data set. Also, rather than returning to step 205, when a feature has not been identified in decision 245 or the method 200 otherwise continues, the method 200 can return to another step, such as step 225 or step 230 to generate or capture additional metadata, respectively.

In step 250, the computing system can generate an output. The output, in some examples, is a display, such as a display indicating an identified or classified feature in the data set 115, metadata captured in step 230 or analyzed in step 240, data elements of the data set 115, or combinations thereof. In other examples, the output can be a command or notification, such as a command to start or stop some action (e.g., collection of data) or a message or alarm indicating that a feature, such as an event, has been identified or classified.

Example 2—Feature Identification/Classification Using a Video Encoder

Figure 3:
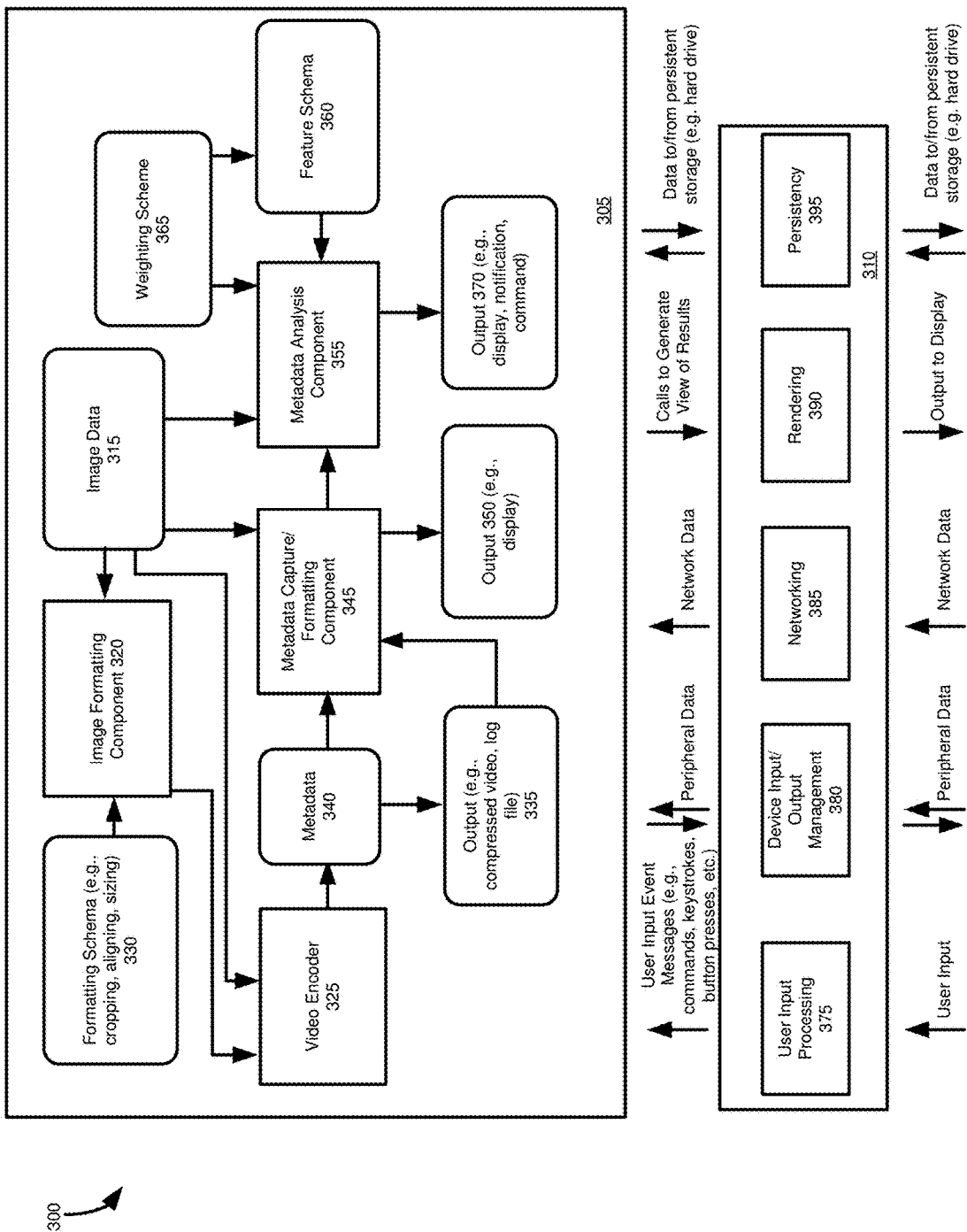
FIG. 3 is a block diagram illustrating an example software environment in which a feature identification/classification component may employ a video encoder and a metadata capture component to aid in the identification or classification of a feature associated with image data, such as image data associated with measurements taken by a scientific instrument.

FIG. 3 illustrates an example software environment 300 that can be used to implement a feature detection/classification component 305 that can work with an operating system ("OS") 310 to detect or classify an event in a data set 315, including a data set that represents measurements taken by an instrument, such as a scientific instrument. The components of the operating system 310, and their interaction with the feature identification/classification component 305, can be generally similar to the components of the operation system 110 of FIG. 1, and their interaction with the feature identification/classification component 105, and will not be further described.

The software environment 300 can represent a specific implementation of the software environment 100 of FIG. 1. The software environment 300 can be implemented in any suitable computing device, such as a desktop computer, laptop computer, netbook, workstation, tablet-computing device, or smartphone (or similar mobile computing device).

The data set 315, for example a data set that represents measurements, can be image data that includes a set of discrete images, video (including multiple frames), or data to be converted to a video format. Or, the data set 315 can be a time series of sample values or other type of data described for the data set 115 of FIG. 1. As with the data set 115 of FIG. 1, the data set 315 can depict a subject, or can represent other information associated with a subject.

The data set 315 can be received by an image-formatting component 320. In some implementations, the image-formatting component 320 can determine whether the data set 315 is in an appropriate format for processing by a video encoder 325. For example, sample values in a time series can be converted to sample values of image data, placing the sample values of the time series from left to right across a row of the image, and repeating row-after-row from the top of the image to the bottom of the image. In further implementations, the image-formatting component 320 can format the data set 315 into an appropriate format for the video encoder 325. For example, if the data set 315 includes a set of discrete images, the image-formatting component 320 can format the images as video frames. If the data set 315 is video image data, formatting by the image-formatting component 320 can include converting the video image data from a first video format to a second video format. For example, the video encoder 325 may be configured to process one or more particular formats, or the video encoder 325 may produce more useful output 335 or metadata 340 from source video data in particular formats.

Formatting the data set 315 can also include operations such as clipping video image data—that is, selecting a particular time period, segment, or collection of frames to be processed by the video encoder 325, resizing the image data, such as formatting a group of discrete images or frames to a common size, reorienting (such as rotating or aligning) one or more images or frames, such as to a common alignment or orientation or to stabilize the video image data, or cropping the images or frames (such as to provide a consistent field of view or a consistent or desired view of a subject across multiple images or frames).

Formatting applied by the image-formatting component 320 can be specified by a formatting schema 330. For example, the formatting schema 330 can specify a file or image format, an image size, or a subset of the data set 315 to provide to the video encoder 325. A given one of the formatting schema can specify formatting operations when converting from a specific input data type or format into a specific output data type or format useable by the video encoder 325. In some implementations, the formatting schema 330 and/or the image-formatting component 320 may be omitted and image data (in the data set 315) may be provided directly to the video encoder 325.

The video encoder 325 processes the image data. The video encoder 325 may be, or be part of, a process to produce a particular output 335, such as compressed video data encoded in a particular format (a final output), or a log file (an intermediate output). As part of the encoding/compression process, the video encoder 325 generates metadata 340. In at least some cases, at least a portion of the metadata 340 can be included in the output 335. For example, at least certain metadata 340 may be determined by analyzing an output 335 that includes compressed video data. At least certain metadata 340 may be obtained by analyzing or parsing a bit stream of the output 335, such as by processing the output 335 with a video decoder. In some cases, all or a portion of the metadata 340 can be obtained directly from the video encoder 325, e.g., in a log file (which, at least in some implementations, can also represent an intermediate output 335). In other cases all or a portion of the metadata 340 may be obtained only directly from the video encoder 325 (e.g., in a log file) or from the output 335.

As an example, certain video encoders, such as FFmpeg or Libav, useable as the video encoder 325 can operate in a two-pass mode. In a first pass, the video encoder 325 can analyze the video data, generating metadata 340. The metadata 340 can be obtained directly from the video encoder 325, including during runtime. The metadata 340 can also be stored in a log file.

In a second pass, two-pass video encoders can use the metadata 340 generated in the first pass, such as metadata 340 stored in a log file, to encode or compress the image data 315 to produce encoded video data, such as a compressed video stream or a compressed video file. The encoded video data can be an output 335.

In various implementations, the video encoder 325 can include all or a portion of the functionality of a source video encoder. Using a video encoder 325 based on a two-pass video encoder as an example, in some implementations, the video encoder 325 can include and operate in a full two-pass mode, such as generating metadata 340 in a log file and an encoded video data output 335. In further implementations, the video encoder 325 may carry out or include a portion of the features of a source video encoder. For example, the video encoder 325 may carry out, or include functionality for, carrying out only the first-pass of a source two-pass video encoder. In yet further examples, the video encoder 325 may carry out, or include functionality for carrying out, only particular algorithms or methods of the source two-pass video encoder. In at least some implementations, the video encoder 325 need not produce, or be capable of producing, an output 335, such as an output 335 that would be produced using the full functionality of a source video encoder.

The video encoder 325 can seek to reduce the size of the video image data by reducing redundancy in the video image data. Metadata 340 produced by the video encoder 325, including metadata in a log file or the output 335, can include information related to differences between two or more of the frames of the video image data. For example, in a series of frames, particular portions of the frame may remain unchanged over multiple frames, while other portions may change. When an image portion changes, the change may include a spatial movement of the image portion between frames. The metadata 340 can reflect information regarding changed/unchanged portions of the video image data, which can be used to reduce the amount information needed to reproduce the video image data, at least to a particular level of fidelity.

A metadata capture/formatting component 345 can capture all or a portion of the metadata 340, such as one or more types of metadata 340 and their associated values. For example, only a portion of the metadata 340 may be indicative of the presence of a particular feature. In various implementations, metadata 340 may be captured directly from the video encoder 325, from a log file, an output 335 (e.g., a final output, such as encoded video), or a combination thereof, by parsing the metadata, deriving the metadata from elements of encoded video data, or extracting the metadata from an intermediate representation. The metadata capture/formatting component 345 may also format metadata, such as for generating an output 350.

The output 350 can be generally similar to the output 150 of FIG. 1. For example, the output 350 can include a display of one or more types of metadata 340 and their associated values, such as for one or more images of or based on the data set 315. A display can also include a display of one or more elements of the data set 315. In a particular implementation, the output 350 can provide an interactive display allowing a user to select metadata 340 types and values to view, and to view elements of the data set 315 that may be of interest.

The feature identification/classification component 305 can include a metadata analysis component 355. The metadata analysis component 355 can apply one or more feature schemas 360 or weighting schemes 365, including feature schemas 360 that include a weighting scheme 365. The metadata analysis component 355 can generate an output 370, such as a display, notification, or command. An example implementation of a video encoder 325, a metadata analysis component 355, an event schema 360, and an output 370 is described with reference to FIGS. 4 and 5.

Figure 4:
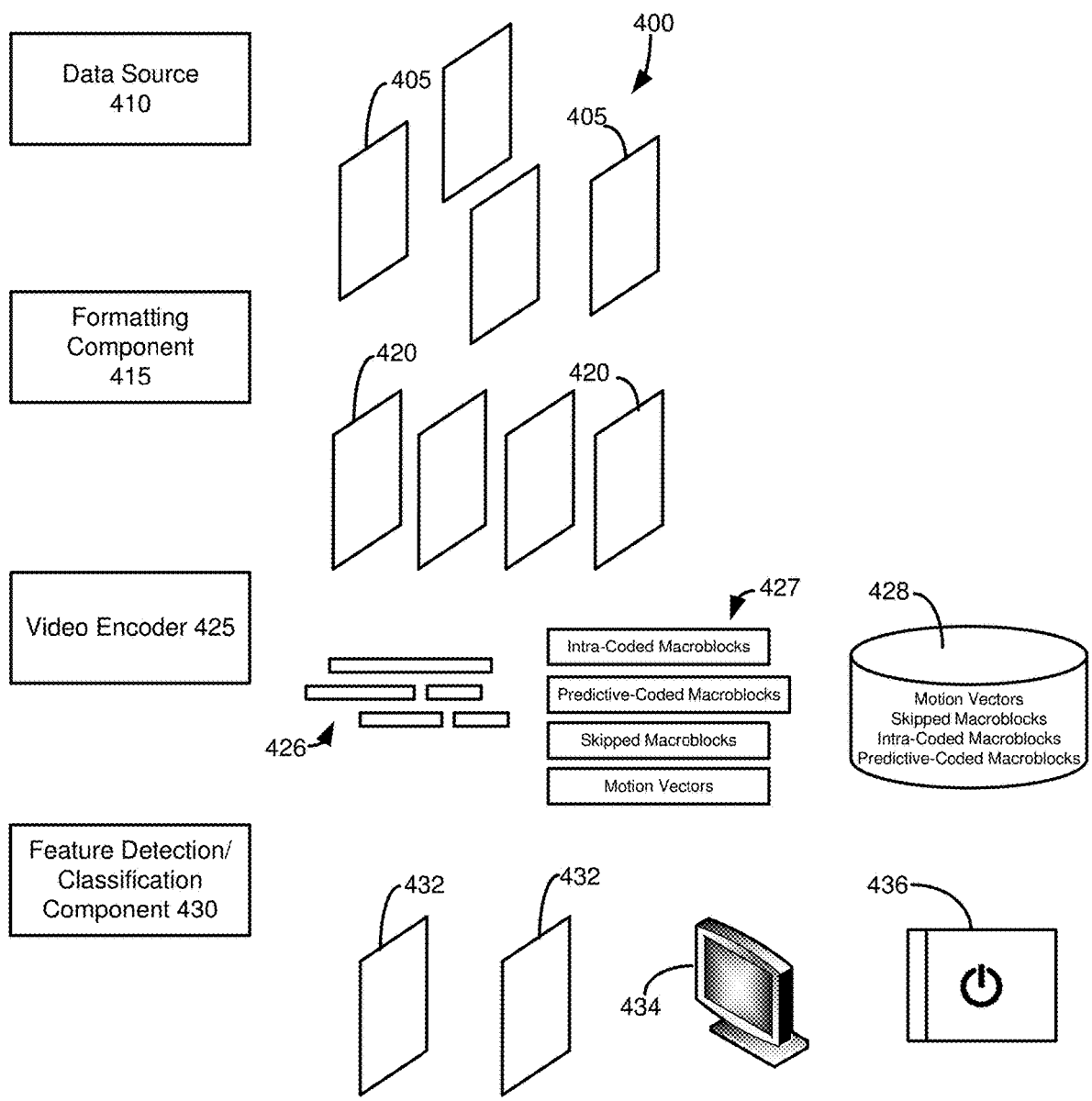
FIG. 4 is a diagram illustrating example operations occurring in identifying or classifying a feature, such as a feature associated with measurements taken by a scientific instrument, which are depicted in image data, using metadata generated by a video encoder.

FIG. 4 is a schematic diagram illustrating how a video encoding process 400 (e.g., a process carried out using the feature identification/classification component 305 of FIG. 3) can be used to generate metadata (e.g., metadata 340 of FIG. 3). The process 400 operates on a plurality of images 405, which can be video frames or discrete images, provided by a data source 410 or created based on non-image data provided by the data source 410. The images 405 are shown as being inconsistent in some way, such as being misaligned. Before further processing, the images 405 can be formatted by a formatting component 415 (such as the image-formatting component 320 of FIG. 3) to produce formatted images 420, shown as aligned. In some cases, the formatting component 415 may be omitted, such as when the images 405 are provided in a consistent format or a format otherwise useable by a video encoder 425 without additional formatting.

The images 415 (or 405, when the formatting component 415 is omitted) are processed by a video encoder 425. The video encoder 425 can produce one or more of compressed video data 426 (such as data in a bit stream), runtime metadata 427, and stored metadata 428. Stored metadata 428 can include metadata output by the video encoder 425 in a log file.

A feature identification/classification component 430 (e.g., metadata analysis component 355 of FIG. 3) can analyze metadata, such as runtime metadata 427 or stored metadata 428, in order to identify or classify a feature, such as an event, in the plurality of images 405. In some cases, the metadata can be metadata captured by a capture component (e.g., metadata capture/formatting component 345 of FIG. 3). Optionally, the feature identification/classification component 430 can itself extract metadata to analyze the compressed video data 426 or the images 405.

The feature identification/classification component 430 can provide an output, such as a display of one or more frames 432 of the image data 405 depicting, or related, to an identified or classified feature. The output can also include a display or notification 434, such a display of, or an alert or message containing, information about the identified or classified feature. In another example, the notification may be a command 436, such as to a device or computing system, to take an action, such as to begin or end data acquisition.

Figure 5:
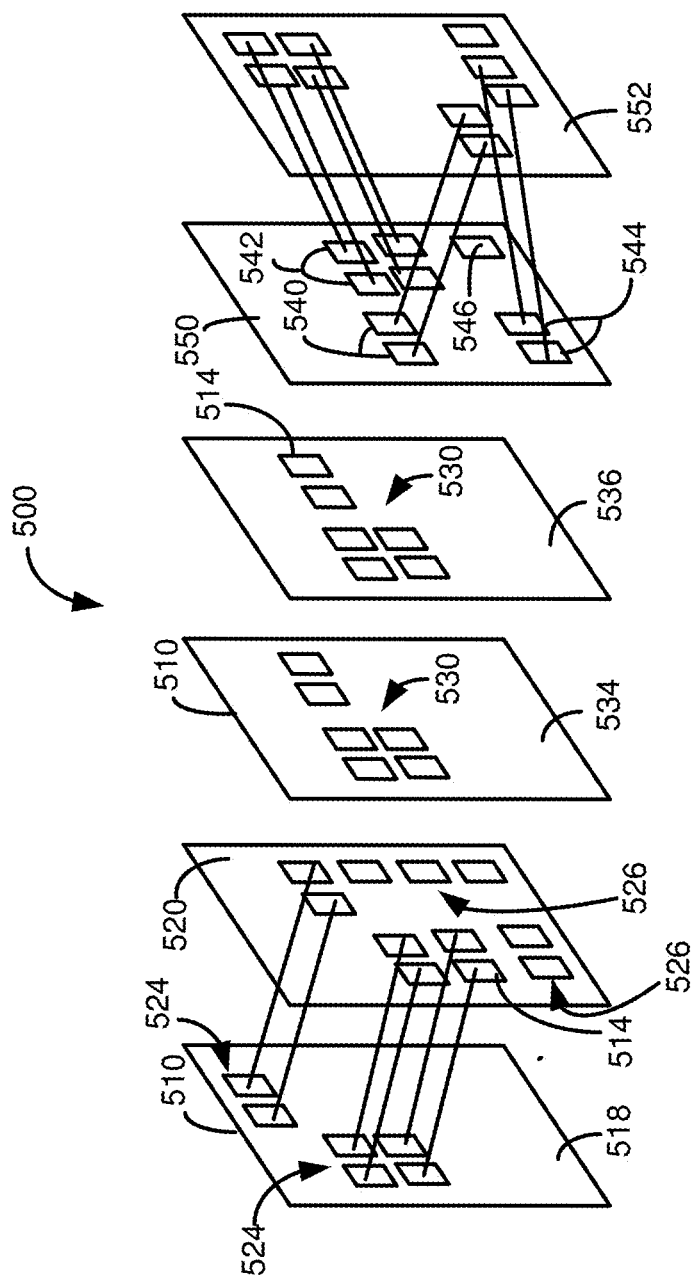
FIG. 5 is a diagram illustrating a series of example video frames, depicting various relationships between frames or frame elements, such as macroblocks.

FIG. 5 presents a schematic diagram of a video encoding process 500, and how the process may be used to generate metadata that can be used to identify or classify a feature. FIG. 5 illustrates a series of frames 510. The frames 510 may be, for example, images of the plurality of images 405 of FIG. 4. Each frame 510 can be divided by a video encoder, such as the video encoder 425 of FIG. 4, into a plurality of units, such as macroblocks 514. The video encoder 425 can use more than one type of unit. For example, the video encoder 425 can operate on a slice, which can include one or more macroblocks 514, or a block, where each macroblock 514 can include a plurality of blocks. FIG. 5 shows only selected macroblocks of the respective frames 510. In practice, an entire frame is typically partitioned into macroblocks for compression.

In FIG. 5, lines between macroblocks 514 of two adjacent frames 510 indicate macroblocks 514 that are at least partially consistent between the frames 510, but whose location in the frames 510 differs. Regarding frames 518, 520, macroblocks 524 have all shifted down from frame 518 to 520. While the macroblocks 524 appear in both frames 518 and 520, macroblocks 526 appear only in frame 520.

The macroblocks 524 and 526 of frame 520 are unrelated to macroblocks 530 of frames 534 and 536. None of macroblocks 530 are different between frames 534 and 536. Macroblocks 530 are unrelated to macroblocks 540, 542, 544, and 546 of frames 550 and 552. Between frames 550 and 552, macroblocks 540 have shifted down, macroblocks 542 have shifted up, and macroblocks 544 have shifted right. Macroblock 546 is unchanged between frames 550 and 552.

With reference to FIGS. 4 and 5, the video encoder 425 can generate various kinds of metadata, including metadata describing the relationship between the frames 510, including the relationship between the macroblocks 514 of the frames 510. Considering the frames 510, certain frames, such as frames 518, 534, and 550, can be unrelated, or comparatively unrelated, to other frames 510, such as adjacent frames. The video encoder 425 may encode all data related to frames 518, 534, 550, which can be compressed as intra-coded frames. Frames 520, 536, 552 are related, respectively, to frames 518, 534, 550. For frames 520, 536, 552, all or a portion of the macroblocks 514 can be described by referring to their reference frames, which are reconstructed versions of intra-coded frames 518, 534, 550. When encoded using one or more reference frames, frames 520, 536, 552 can be referred to as predicted frames.

Metadata generated by the video encoder 425 can include information about whether a frame 510 is an intra-coded frame or a predicted frame. A change from a predicted frame to an intra-coded frame can indicate that the two frames are comparatively less similar. A change from an intra-coded frame to a predicted frame, or a series of predicted frames, can indicate comparatively more similarity (e.g., less change) between frames 510. Depending on the nature of a feature, a switch to a period of less similar frames 510, a switch to a period of more similar frames 510, or a particular period of consistent or inconsistent frames 510 can be used to identify or classify a feature. For example, during data acquisition, a change from comparatively similar images to one or more dissimilar images can indicate a problem with the data acquisition source.

A predicted frame 510 can have predictive-coded macroblocks 514 that are encoded using a reference frame as well as intra-coded macroblocks 514 that are encoded only using the current frame. For example, in frame 520, macroblocks 524 can be predictive-coded, using information from the reconstructed version of frame 518 as a reference frame. Macroblocks 526 are unique to frame 520, and thus may be intra-coded.

Metadata can also include information about the number of, sample values of, or compressed data size of intra-coded macroblocks in a frame, the number of, sample values of, or compressed data size of predictive-coded macroblocks in a frame, or the number of macroblocks that were skipped (such as macroblocks that did not change, or change significantly, between a predicted frame and its reference frame). The compressed data size of the macroblocks can be a size of information used to encode the macroblocks, such as an amount of memory or storage space (such as measured in bits or bytes).

Frame 552 has a higher number of predictive-coded macroblocks (macroblocks 540, 542, 544) than frame 520 (macroblocks 524). However, frame 520 has a higher number of intra-coded macroblocks (526) than frame 552 (macroblock 546). Frame 534 has a higher number of intra-coded macroblocks than frame 520, as all of macroblocks 530 are unique to frame 534 compared with frame 520. The macroblocks 530 of frame 536 are identical to the macroblocks 530 of frame 526, and thus may be skipped during encoding. Similarly, macroblock 546 is identically positioned in frames 550 and 552, and may be skipped during encoding.

A greater number of skipped macroblocks may indicate fewer changes between frames 510. A greater number of predictive-coded macroblocks compared with skipped macroblocks may indicate a higher number of related changes between frames 510. In contrast, a larger number of intra-coded macroblocks, or a lower number of skipped macroblocks, can indicate more significant changes between frames 510. Changes in the relative numbers, or compressed data size, of intra-coded, predictive-coded, and skipped macroblocks can be used to identify or classify a feature, including in a similar manner to intra-coded and predicted frames.

Using crystal growth as an example, a high number of skipped macroblocks can indicate that crystal growth has not occurred, has ceased, or has plateaued. A change in crystal size can be indicated by a decrease in the number of skipped macroblocks and an increase in the number of predictive-coded or intra-coded macroblocks.

How predictive-coded macroblocks in a frame 510 were encoded can also be used as metadata. For example, for interlaced video, predictive-coded macroblocks can be encoded on a macroblock by macroblock basis as a part of a frame picture or parts of two field pictures, with the parts of field pictures corresponding to interleaved rows that have been separated by top field/bottom field. The number of field-coded macroblocks produced by field segmented encoding can be used as metadata. For example, a higher number of field-coded macroblocks can be indicative of a greater degree of motion in the frame compared to a reference frame. A lower number of field-coded macroblocks can indicate less motion between frames, or that frames are sufficiently similar that it is more efficient to encode the macroblocks treating the interlaced picture as a single frame, rather than as two interlaced fields.

Metadata generated by the video encoder 440 can also include motion vector data that describes the movement of the macroblocks, including the magnitude and direction of motion between frames 510. In addition to the motion vectors themselves, the metadata can include information regarding the resolution of the motion vectors, such as a number of pixel or sub-pixel (non-integer) units by which a macroblock 514 can be offset in a predicted frame relative to its reference frame, which can affect the resolution or fidelity of the compressed video data. Smaller motion vector values can indicate less motion in a predicted frame compared with a reference frame.

Metadata can also include a number of bits used for motion vectors, where larger values can indicate a greater number of macroblocks 514 having been moved in a predicted frame relative to its reference frame, indicate that the magnitude of motion is greater in the predicted frame relative to its reference frame (when higher magnitude motion vectors cost more bits to encode), or indicate that motion is more complex in the predicted frame relative to its reference frame (when complex motion costs more bits to encode due to failures in motion vector prediction). In these cases, the reference frame is a reconstructed version of the previous frame.

The metadata can include further metadata types related to differences (such as the variance) of sample values (or, for a predictive-coded macroblock, residual values computed as differences between original sample values and motion-compensated prediction values) within a macroblock 514, the sum of such differences over a frame, differences between macroblocks 514 in a frame, or differences between macroblocks 514 between frames. In some cases, the macroblock 514 can be a specific type of macroblock, such as a predictive-coded macroblock or an intra-coded macroblock. Changes in macroblock differences between frames 510 can indicate a change in the image represented by the frames 510. For example, a change from a high macroblock variance to a low macroblock variance can indicate a significant difference between frames 510.

Metadata can also include information about the compressed data size (such as in bits) of each frame 510, where large compressed data sizes can indicate greater complexity or higher changes occurring the frame compared to a reference frame or neighboring frames.

In some aspects, metadata values can be analyzed over a plurality of frames. For example, the sum of macroblock variance may be summed over a plurality of frames. In some cases, a feature can be identified or classified when a significant change occurs in the running total of a metadata type, such as a sudden increase or a period of little change. For example, during crystal growth, a period of little change in the running total of the macroblock sum of variance can indicate that crystal growth has ceased or plateaued.

Identifying or classifying a feature using the feature detection/classification component 430 can include detecting a change, pattern, or value of one or more types of metadata. As described above, various types of metadata produced by the video encoder 425 can be used to determine the amount of motion in a frame 405. A change from a series of frames 405 exhibiting motion to a frame 405 exhibiting reduced motion, such as substantially reduced motion, can be used to identify a feature, such as an event, in the images 405. For example, when the images 405 represent NMR spectra, a change from frames 405 exhibiting motion to a frame or series of frames 405 exhibiting no motion or reduced motion can indicate that a chemical reaction or other process has ceased, at least temporarily, or that further data acquisition is unlikely to improve the signal to noise ratio of a result.

Similarly, a change from a frame or series of frames 405 exhibiting little or no motion to a frame or series of frames 405 having increased motion can indicate that an event has occurred. For example, during crystal growth, a transition from frames 405 exhibiting no or little motion to frames 405 exhibiting increased motion can indicate that crystal growth is occurring. Subsequent frames 405 with metadata indicating reduced motion (or skipped macroblocks, indicating no motion or other change) can indicate that crystal growth has reached a plateau stage or has ceased.

In a similar manner, a series of predicted frames with little or no motion can indicate at least a degree of consistency between the frames 405. The presence of intra-coded frames can indicate less consistency between frames 405, or that the intra-coded frame is sufficiently unrelated to one or more potential reference frames.

While in some cases a feature might be identified or classified based on a single type of metadata, in other cases multiple metadata types may be analyzed to determine the presence of a feature or to classify the feature. For example, initiation of crystal growth might be indicated when all or a portion of multiple metadata types representative of motion exceed a certain threshold. The presence or identify of a feature may be defined by one or more metadata types and particular values (e.g., using a feature schema 360 or a weighting scheme 365). As another example, again using NMR spectra, the initiation of a chemical reaction or process may be indicated by one or more metadata types representative of motion exceeding or maintaining particular values. However, an error condition for the instrument might be indicated by a change from predicted coded frames to intra-coded frames, rather than indicating a sudden change in the subject.

Figure 6:
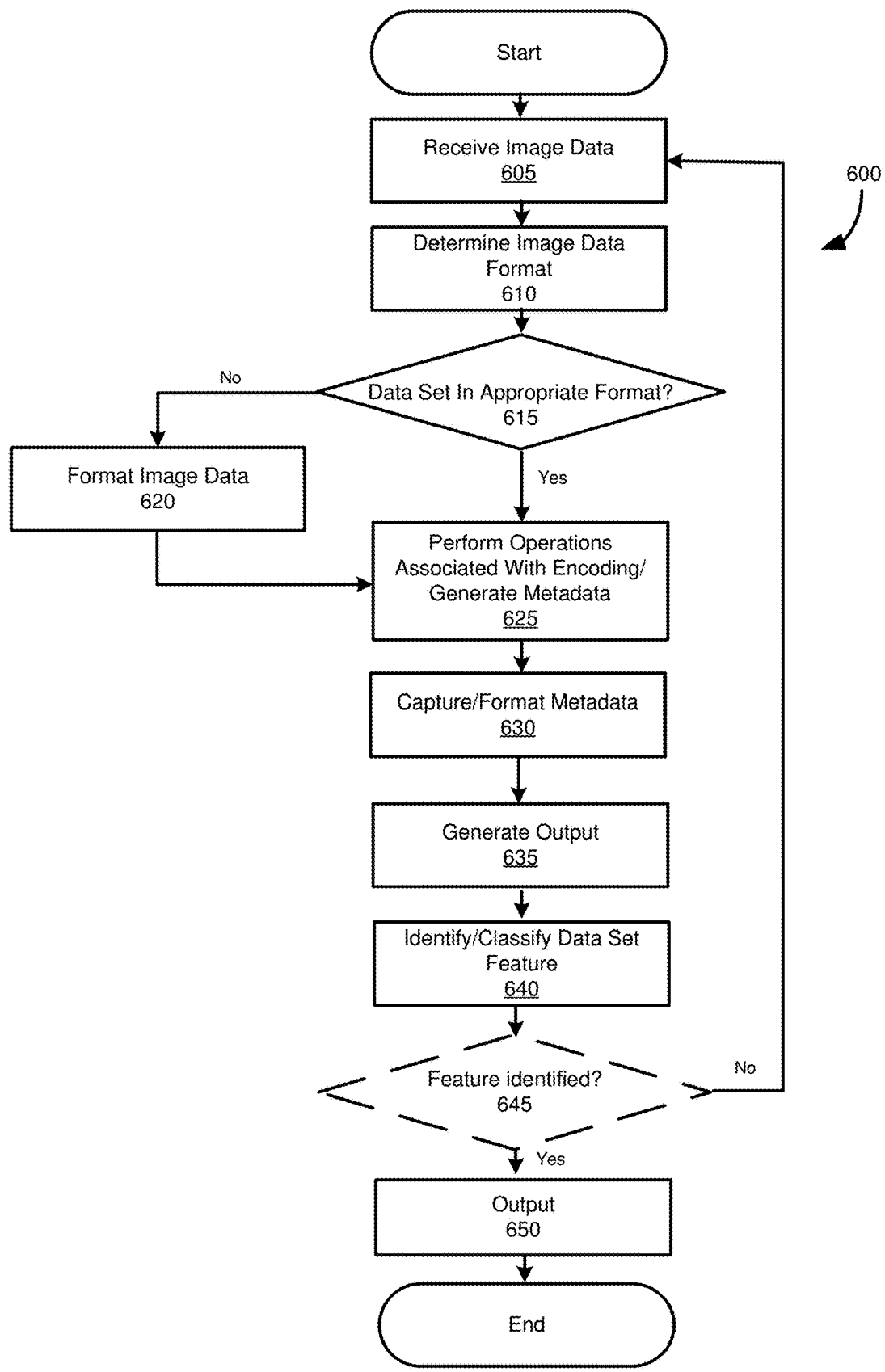
FIG. 6 is a flowchart of a method according to an embodiment of the present disclosure for identifying or classifying a feature, such as a feature of measurements taken by a scientific instrument, which are depicted in an image data set, using a video encoder and a metadata capture component.

FIG. 6 illustrates a method 600 of identifying or classifying a feature of measurements of a subject taken by an instrument, which are depicted in, or associated with, image data, using a feature identification/classification component, such as the feature identification/classification component 305 of FIG. 3. In step 605, a data set is received. The data set can be a series of discrete images, or video data that is formed from a plurality of frames. A data set format can be determined in step 610. In decision 615, the method 600 can determine whether the data set is in an appropriate format, such as a format useable by a video encoder, or whether the format can be optimized for use by the video encoder. If it is determined that the data set is not in the appropriate format, the data set can be formatted in step 620. For example, a time series of sample values or a set of discrete images can be converted to a video format. If the data set is already in a video format, it can be converted to another video format, such as a video format useable by the video encoder or for which the video encoder may generate more useful metadata. Formatting the data set in step 620 can include other actions to improve metadata generated by the video encoder, such as aligning, cropping, rotating, or resizing all or a portion of image data.

In at least some embodiments, one or more of step 610, decision 615, and step 620 can be omitted. For example, in some cases, the data set format need not be determined in step 610, such as when there is less concern whether the data set will be useable by the video encoder, or if the video encoder is capable of determining the data set format. Decision 615 can be omitted for similar reasons.

In some cases, rather than formatting the data set in step 620, the method 600 may stop if the data set is determined not to be in an appropriate format for the video encoder in step 615. Alternatively, decision 615 can include determining an appropriate video encoder to use, or appropriate settings for a video encoder, in which case step 620 can be omitted.

In step 625, operations associated with video encoding are carried out on the image data to provide video encoder metadata. The video encoder metadata can be useful in the production of encoded video data, such as compressed video data in a data stream or stored in a file. In some cases, step 625 can produce an output, such as encoded video data in which metadata is embedded. In other cases, step 625 does not produce such an output but still produces metadata in a log file or otherwise.

At least a portion of the video encoder metadata is captured in step 630. The metadata can be captured from an output of step 625, from a log file, from the video encoder, or a combination thereof. In optional step 630, an output is generated, such as a display of one or more types of video encoder metadata, all or a portion of the image data, or a combination thereof.

A feature depicted in, or associated with, the image data can be identified or classified in optional step 640 based at least in part on the captured video encoder metadata. In at least some implementations, the identification or classification of the feature is not used solely in the production or manipulation of encoded video data. In some cases, a user can carry out the identification or classification. In other cases, the identification or classification can be carried out by a computing system, such as a computing system implementing other steps of the method 600. In such cases, the computer system can receive a feature schema that includes parameters associated with the identification or classification of a feature. For example, the schema may include metadata types to be analyzed, and values that indicate the presence or nature of the feature. In at least some cases, step 640 can also use a weighting scheme that weight a plurality of metadata types or at least one metadata type and one or more other parameters. In particular examples, the weighting scheme can be included in the identification or classification schema.

In optional decision 645, the method 600 can determine whether a feature has been identified or classified. In some implementations, if a feature has not been identified or classified, the method 600 can return to an earlier step, such as step 605, to receive additional image data, step 625, to generate additional video encoder metadata, step 630, to capture additional video encoder metadata, or step 640, to continue the identification or classification of features. In other implementations, the method can proceed to step 650 or end if a feature is not identified or classified in decision 645.

In decision 645, if a feature has been identified or classified, the method 600 can proceed to step 650 to generate an output. The output can be, for example, a display that includes all or a portion of the captured metadata, all or a portion of the image data, information regarding any identified or classified feature, or a combination thereof. In additional examples, the output can include a notification, such as an alert that includes information regarding any identified or classified feature, or a command to take an action, such as to start or stop data acquisition. In some implementations, step 650 can be omitted.

In addition, in further implementations, after generating an output in step 650, or rather than generating the output, the method 600 can return to an earlier step. For example, the method 600 can continue to receive data of a data set in step 605, generate metadata in step 625, capture metadata in step 630, or continue to identify or classify features in step 640.

Example 6—Identifying Features During Crystal Growth Using In-Situ Transmission Electron Microscope Images Atomic scale images of interfaces/defects obtained from (scanning) transmission electron microscopes ((S)TEM) have been used to provide insights into the structure-property relationships of materials—for example, observations of atomic scale intermixing at interfaces in semiconducting/oxide heterostructures has helped understand the unique electronic and magnetic properties of these systems. The development and application of the (S)TEM techniques used in these and other studies start from the premise that the atoms in the structure do not move. However, the systems that are being developed for many novel energy technologies can be quite different, and, in some cases, their intrinsic functionality may be wholly dependent on the motion of atoms. For example, in Li-ion batteries, the charge/discharge cycle involves the mobility of ions across an electrolyte-electrode interface. To identify the key aspects of the complex processes and transients occurring in energy technologies, it may be beneficial to have in-situ or operando methods that allow the functions of the system taking place during operation of the device to be directly observed.

Figure 7:
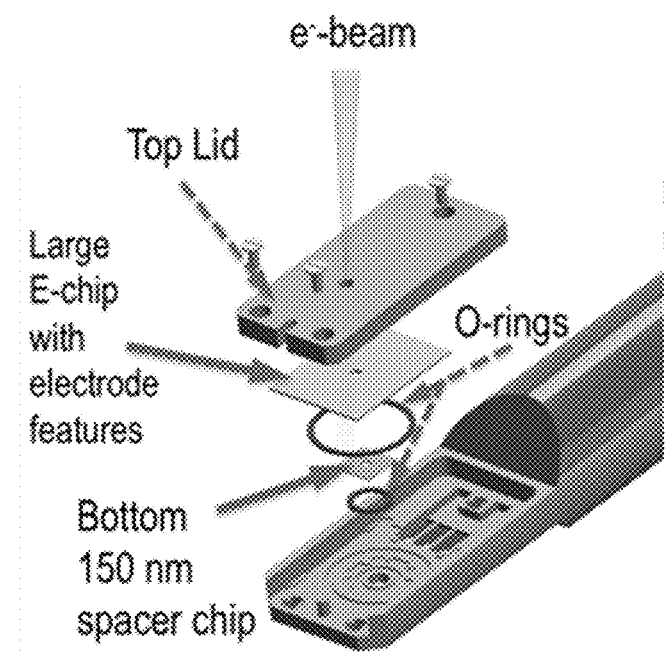
FIG. 7 is a diagram illustrating the components of an operando nanobattery used in the acquisition of video data according to an embodiment of the present disclosure.

For operando studies of electrochemical reactions, in-situ stages have been developed for (S)TEM that allow electrodes and a liquid electrolyte to be incorporated into the microscope—essentially forming a nanobattery. In these experiments, the images are typically recorded on either charge-coupled devices (CCDs) or direct detection complementary metal oxide semiconductor (CMOS) devices that have arrangements of pixels from 1 k×1 k up to 4 k×4 k, as shown in FIG. 7. Understanding the electrochemical process may be facilitated by directly imaging the initial stages of electrodeposition on the electrode surfaces (the formation of Li dendrites). In current detectors, the frame rates are typically video rate (33 frames per second), with more advanced cameras operating at 1000 frames per second. Future developments in both microscopes and detectors are expected to push this frame rate up by several orders of magnitude. It can already be a significant challenge to analyze data from a region of interest.

Current image capture and analysis is typically performed manually—the user starts the camera and looks for any change to occur in the images as they are recorded. This is often a tedious process that requires frames to be individually analyzed to identify regions of interest. However, the present disclosure recognizes that this type of problem—the identification of where and when in a series of frames there is a change—lends itself to automation. Recent trends in digital and streaming media have introduced a number of techniques that can be used to automate the analysis of videos. In order to perform automated analysis of video, it can be segmented into a hierarchy of shots. Shots refer to a group of frames that make up a single camera action. This process, referred to as shot boundary detection (SBD), allows for analysis of digital media by regions of similar content. Computational efficiency can be beneficial in video segmentation in order to provide timely feedback.

Video is typically stored and transmitted in a compressed format, such as one of the Moving Picture Experts Group (MPEG) standards. While these compressed formats are convenient for storage and streaming, they can be computationally expensive to decompress for the purposes of analysis. In the case of (S)TEM, where image data is captured at a rate of hundreds or thousands of frames per second, the expense of decoding the video can grow very quickly. In this case, performing analysis of the compressed stream directly or performing analysis of a log file created during compression can increase efficiency. This Example 3 demonstrates analyzing a compressed data stream or log file. Example 3 identifies features, such as events, in the electrodeposition of Li during charge/discharge of a Li battery. For example, the onset of the deposition can be identified, and can be correlated with a voltage driving force.

Methods

Experimental

Figure 8:
FIG. 8 is a scanning transmission electron microscope high angle annular dark field image depicting the deposition of lithium on a platinum electrode.

In-situ electrochemical (S)TEM experiments were performed on a FEI 80-300 kV Cs corrected Titan microscope equipped with Schottky field-emission electron source, a monochromator, and a CEOS hexapole spherical probe aberration corrector. For these experiments, the microscope was operated at 300 keV in both bight field (BF) and high angle annular dark field (HAADF) modes (FIG. 8). All images were obtained after calibration of the dose, and the dose was kept below ≤0.3 electrons/Å$^2$/s to avoid beam damage effects. All electrochemical measurements were performed with a commercially available Poseidon 500 (Protochips Inc., Raleigh, N.C., USA) microfluidic in-situ electrochemical stage, which allowed for simultaneous observation of dynamic electrochemical measurements in the liquid environment (FIG. 7).

The electrochemical cell itself was located in the tip of the TEM holder with two Si microchips (a top ec-chip with 3 Pt electrodes, a 500 nm SU-8 spacer, and a 50 nm $Si_3N_4$ membrane, and a bottom chip with a 150 nm spacer and a 50 nm $Si_3N_4$ membrane) sealed within the tip by two O-rings (FIG. 7). This configuration was then used to form an operating battery with anode, cathode, and non-aqueous liquid electrolyte (although a standard Li-ion battery electrolyte was used, the standard electrodes in Li batteries are not Pt).

The microfluidic channels were integrated inside the holder to permit the circulation of the electrolyte at 3 µL/min flow rate, thereby providing the new Li$^+$ ions that are consumed during battery operation. This approach permitted direct observation of the electrochemical processes at the anode/electrolyte interface without the need for a Li metal source. In order to prevent contamination of the sensitive battery electrolyte (1.0 M lithium hexafluorophosphate ($LiPF_6$), in propylene carbonate (PC)) by water and oxygen, the electrolyte solutions were prepared and an in-situ ec-cell was assembled in an Ar-gas glove box. Cyclic voltammetry experiments were conducted with a Gamry Reference 600 potentiostat with simultaneous recording of the video sequence of Li dendrite deposition/dissolution process at the Pt electrode from $LiPF_6$ in PC electrolyte.

Video Streaming

Many techniques exist that aim to directly handle compressed video streams for quick and efficient processing. These techniques typically rely on the reduced signal and coefficients produced as part of the compression process. The coefficients generated directly relate to the original uncompressed signal and can be used to detect transitions in a video. While there are numerous ways for video frames (scenes) to transition, they can typically be categorized as either a cut or gradual transition.

A cut occurs when a scene is ended in one frame and a new scene begins in the next frame. Gradual transitions are a change between two scenes where the content of one shot is slowly replaced with that of the next over several frames. Both of these types of shot, or scene, boundaries can come in many different forms.

In the case of crystal growth detection, it is likely that after the initial nucleation event (a cut scene) a gradual transition will take place as the material grows. An added complication for this type of experiment is that the object of focus tends to change over the course of several frames as the experiment is performed. With these types of gradual transitions, it is important to consider differences over a window of time. The window size can vary depending on the speed and type of transition. A general window size can be chosen to fit the transition type, as well as the type of data observed.

MPEG Standards

An MPEG standard (such as the MPEG-2 standard or MPEG-4 standard) provides a set of guidelines for video decompression and transmission of coded video at a variable bitrate. In general, the MPEG-2 standard makes use of two techniques to achieve compression: block-based motion compensation and the discrete cosine transform (DCT). These techniques take advantage of the spatial and temporal redundancy within a sequence of frames to reduce the amount of data necessary to reconstruct the video.

The foundational component of a video is a frame. A frame is an image of a width and height that represents one step in a video. Frames often contain regions of similar visual content within themselves. Storing the values for each individual pixel (usually including three sample values) in an image is costly and unnecessary.

To eliminate this redundant data, the image is divided into small blocks called macroblocks (MB), to which the DCT is applied for intra-picture compression. The transformation produces a matrix of coefficients that represent each block of data. In order to further minimize the amount of data stored, an additional technique, called quantization, is applied. Quantization approximates the transformation coefficient data, which makes subsequent entropy coding more efficient, but causes distortion. Quantization limits the data stored for the image, reducing many of the frequency components to zero in most cases. By controlling the degree of quantization, a video encoder can trade off quality and bit rate, increasing quantization to likely reduce bit rate but introduce more distortion, or decreasing quantization to likely improve quality but increase bit rate.

When played back at a certain frame rate, the frames of the video typically provide a visually fluid motion. Frames in a video typically have common data between one or more frames. To eliminate the need to store this content for individual frames, motion compensation is used for predicted frames. These predicted frames (P frames), more specifically macroblocks within the P frames, reference reconstructed versions of other, previously encoded frames which can be found before or after the predicted frame, and which are called reference frames. Frames that do not reference other frames are referred to as intra-coded frames (I frames). For a macroblock of a P frame, a motion vector represents the displacement, or offset, from the same location (of the macroblock) in a reference frame to a matching region of the reference frame. If the motion vector is zero, the matching region is at the same location in the reference frame as the macroblock is in the P frame.

Figure 9:
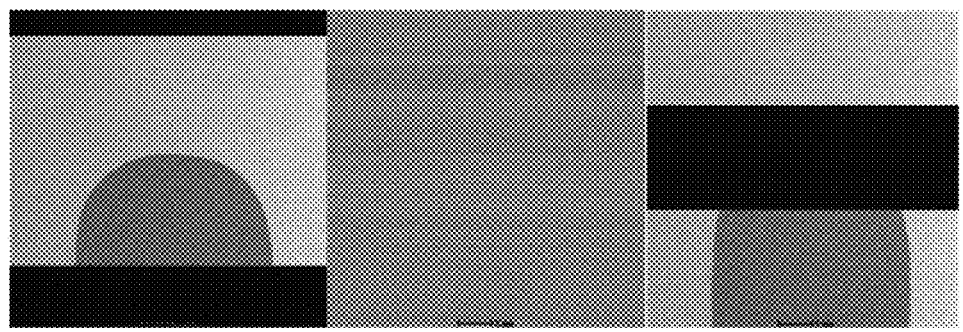
FIG. 9 is a series of scanning transmission electron microscope images of a platinum electrode, illustrating a shot transition caused by adjusting the focus of the microscope.

Motion vectors are calculated during a phase of the encoding process called motion estimation. A video encoder can calculate differences, or residual values, between the original sample values of a macroblock and the motion-compensated predicted values for that macroblock. The residual values can be further compressed using a DCT, quantization, and entropy coding. A skipped macroblock has no residual values in the encoded video data, either because the motion-compensated predicted values are a perfect match or because residual values are quantized to zero Types of Video Transitions Shot boundary detection can be used to segment videos into different shots. Shots within a video are sequences of frames that make up a single camera action. Shot transitions are generally categorized as a hard cut or gradual transition. Hard cuts occur when two consecutive frames form the boundary between shots. The frames in FIG. 9 show an example of a hard cut; these neighboring frames have no similar content shared between them. These are easily detectable, as there is little to no similarity between adjacent frames.

Figure 10:
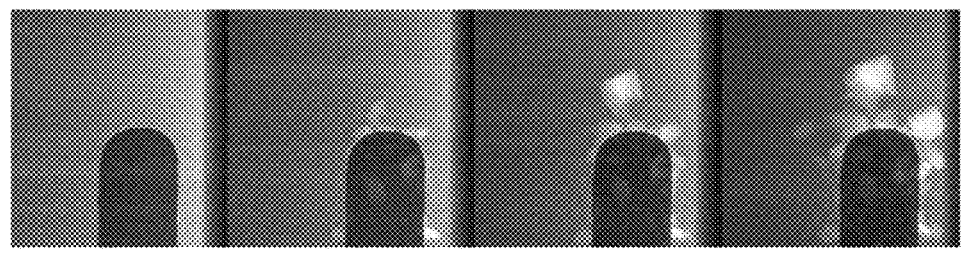
FIG. 10 is a series of scanning transmission electron microscope images of the deposition of lithium on a platinum electrode, illustrating a gradual shot transition as crystal growth occurs.

Gradual transitions take place over multiple frames and can have many different effects. The number of transitions types, with varying durations, can make gradual transitions difficult to detect. Traditional videos can contain a number of gradual transition types, such as pans, zooms, fades, and dissolves, each of which can have differing transitional characteristics. For the purpose of identifying grain growth, dissolves were primarily sought to be identified. Dissolves occur when the contents of one shot transition to the next over some period where the shots overlap. The sequence of frames in FIG. 10 shows the transition typically found with grain growth. The transition occurs over multiple frames as the grain begins to form.

Encoding Information

The videos used in this Example 3 were encoded using the MPEG-2 standard. An MPEG-2 encoding process can generate a number of statistics for each frame of a video. Useful statistics can be generated by partially encoding a compressed video recording of crystal growth. Partially encoding the video can eliminate the need to analyze original frame pixel values. The transform performed for full encoding has been found to consume as much 40% of total encoding time. Therefore, partial encoding can produce significant time savings over other methods.

For the purposes of this Example 3, the FFmpeg library was used to process and encode video streams. Shot boundary detection can use statistics generated during video encoding to identify changes in the crystal growth process. Two types of features that can be used in change detection are frame and motion information. Frame information refers to the type of frame encoding, such as I-frame or P-frame. This can be used for decision making due to the different characteristics of each type of frame. Motion information can include the motion vector values or bits consumed coding motion vector values, as well as other indicators of macroblock motion, such as the sum of variance (e.g., for motion-compensated prediction residual values). The sum of variance of each predictive-coded macroblock can be used to measure the amount of motion within the macroblock, since motion in real world scenarios tends to result in non-zero residual values. This macroblock motion information can be used by the encoder to determine how the macroblock will be encoded, but also serves as an indicator of the amount of change occurring within each block.

Frame Motion

With the video encoded, the frame and motion information can be captured. Separate analysis of frames based on frame type was performed to take advantage of characteristics specific to each type. As previously discussed, predicted frames contain motion information that typically varies in compressed data size depending on the degree of change. Compared to P-frames, intra-coded frames (I-frames) have no motion information due to their limited relation to other frames. Motion information can be used to characterize the amount of change occurring in a frame compared to another frame, which is the reference frame. Often, scenes will have different motion levels, but motion information will remain similar within a scene. The measure of the level and rate of motion change can be used to detect change points within a sequence of frames.

There are multiple types of motion information available for each frame. One type of motion information is the macroblock sum of variance (SoV), which estimates the total motion for a macroblock. Another type of motion information is the motion vector, an effective indicator of change for macroblocks between a series of frames. The SoV and motion vector information can be used as an indicator of how similar a predicted frame is to its reference frame. For example, motion vector information of mostly zero or low magnitude, with residual values having little or no magnitude, indicate a predicted frame is very similar to its reference frame.

In most examples described herein, a reference frame is the reconstructed version of the frame that immediately precedes the current frame (a P frame) in display order. The reference frame has been previously encoded and reconstructed.

Results and Discussion

Sample Videos

Figure 11:
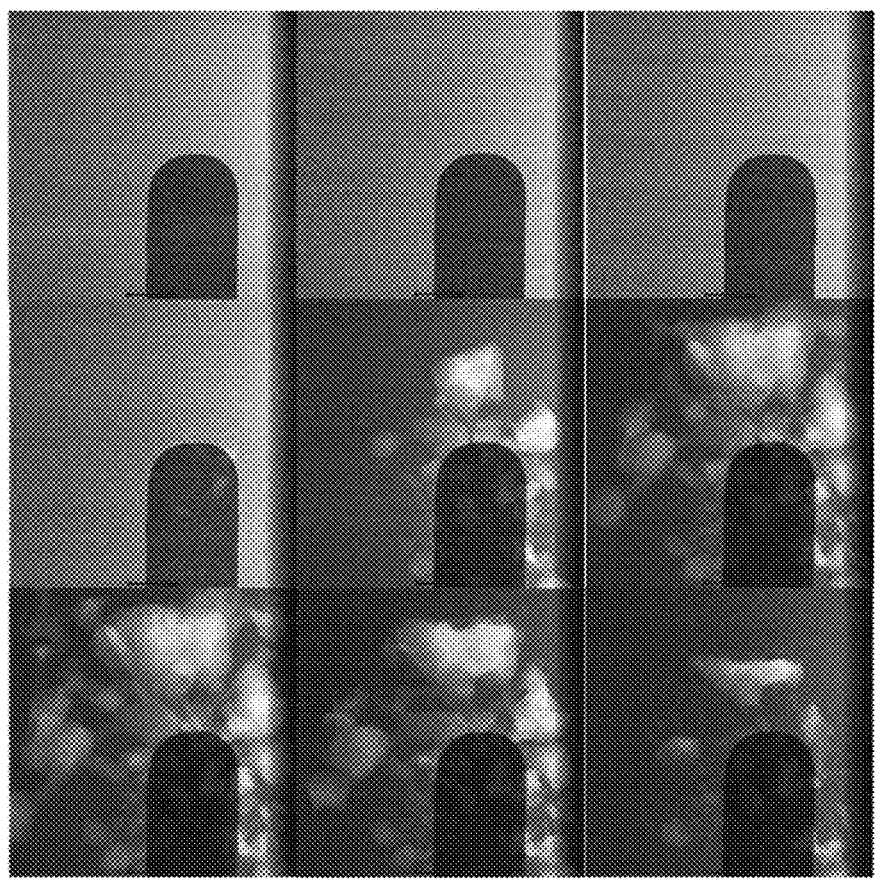
FIG. 11 is a series of scanning transmission electron microscope images of the deposition of lithium on a platinum electrode, where the top row depicts minimal change between images, the middle row depicts crystal growth, and the bottom row depicts a gradual reduction in crystal size.

Two sample crystal growth videos were analyzed using the described technique. The two videos contained visually similar content; each starting with a series of nearly static frames, followed by rapid crystal growth, and finally gradual reduction in crystal size. The growth and reduction occurred over time as captured in a series of frames. Frames from each of these transitions are shown in FIG. 11, which summarizes the three transitions taking place in the video. The first row of images shows the period of minimal change. The second row shows growth over a series of frames. The third row shows a gradual reduction in crystal size over time.

Automated analysis typically involves selection of the video encoding metadata that might be probative of a feature of interest. The two sample videos used in this Example 3 were encoded with the FFmpeg multimedia library. This library allows for full control over the video encoding process through a series of parameters. The parameters chosen for this Example 3 encode the video as MPEG-2 using a constant frame rate (CFR). As opposed to CFR, variable frame rate (VFR) encoding aims to eliminate similar content between frames in order to decrease the amount of data stored. Using CFR in this case reduces additional processing and allows for a fixed video temporal quality level.

Algorithm Application

Figure 12:
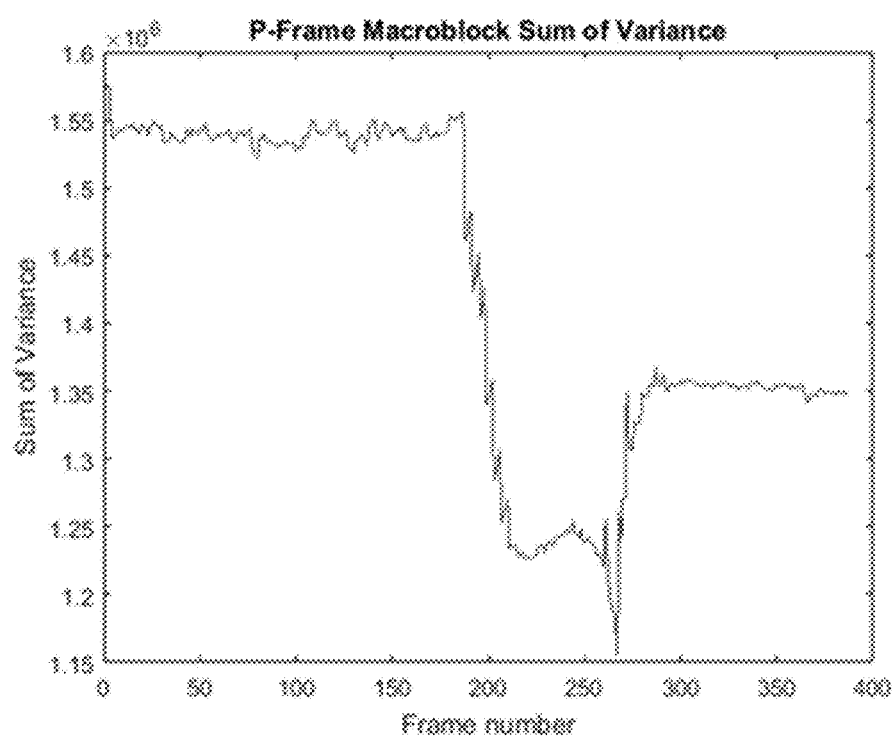
FIG. 12 is a graph of the sum of variance for predicted-frame macroblocks versus frame number for video data obtained from a series of scanning transmission electron microscope images depicting the deposition of lithium on a platinum electrode.

Once the video was encoded in the MPEG-2 format, the generated frame measurements previously discussed were analyzed. Of particular interest were the macroblock sum of variance (SoV) and the frame type. The total macroblock sum of variance for each P-frame is shown in FIG. 12.

Only the P-frames were considered due to the inherent lack of motion information found in I-frames. Two visually distinguishable level changes occurred in this sequence. Regions of static content remained roughly level, while rapid level changes indicated the presence of a change in the crystal growth process.

Feature Detection

Figure 13:
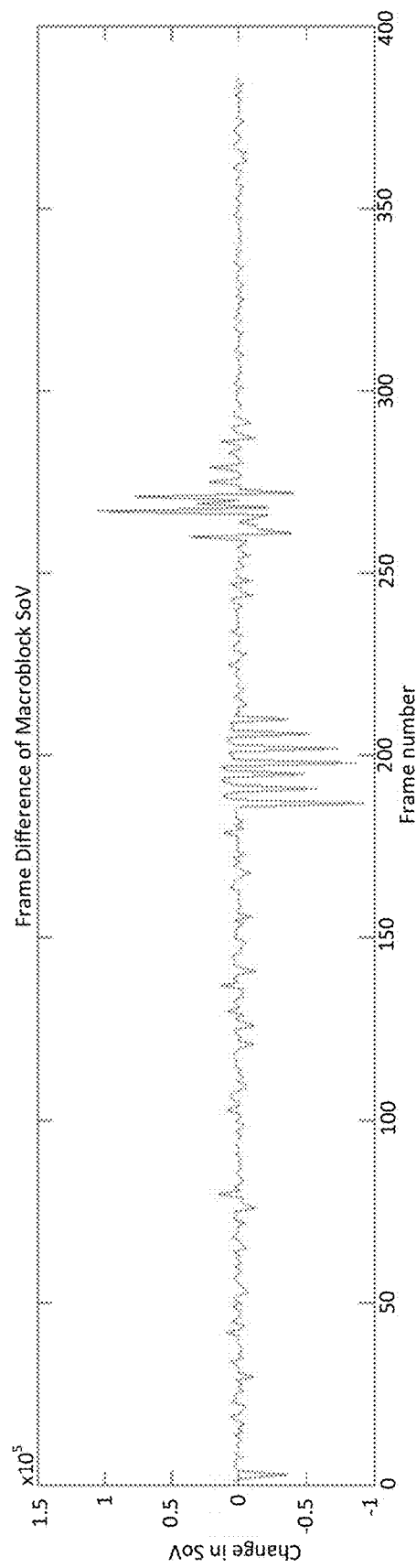
FIG. 13 is a graph of the change in the macroblock sum of variance between consecutive predicted-frames versus frame number for video data obtained from a series of scanning transmission electron microscope images depicting the deposition of lithium on a platinum electrode.

Changes between frames, and thus changes in the crystal growth process, were detected by examining sequential differences in macroblock sum of variance values between P-frames. The difference signal was obtained by subtracting the SoV values of adjacent frames. This difference illustrates the amount of change occurring between consecutive frames, which can be seen in FIG. 13. Regions showing large absolute differences correspond to the regions of change in the original signal.

Figure 14:
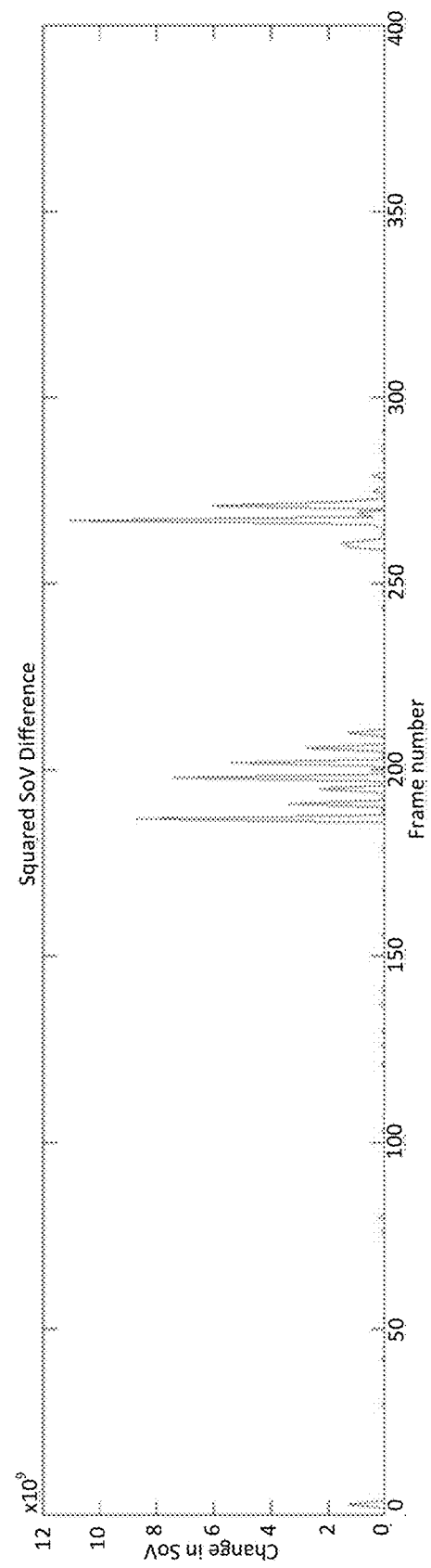
FIG. 14 is a graph of the squared change in macroblock sum of variance values between consecutive predicted frames versus frame number for video data obtained from a series of scanning transmission electron microscope images depicting the deposition of lithium on a platinum electrode.

In order to detect regions of change, it can beneficial to reduce background noise. To further reduce noise, the difference signal was squared. Squaring the difference signal emphasized changes, while suppressing low frequency noise. The result provided a clearer difference between frames. An example of the noise reduction compared to the original difference signal can be seen in FIG. 14. The peaks in the difference signal make it possible to distinguish where transitions occur.

Figure 15:
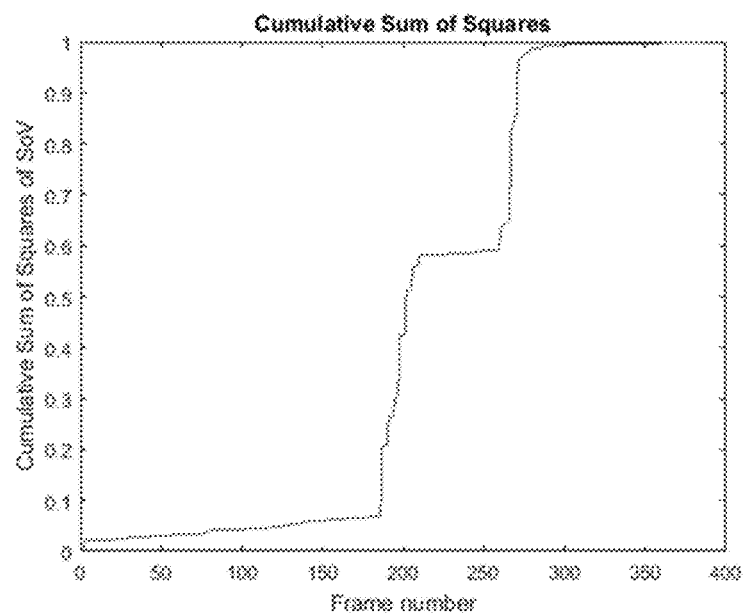
FIG. 15 is a graph of the cumulative sum of squares of macroblock sum of variance values versus frame number for video data obtained from a series of scanning transmission electron microscope images depicting the deposition of lithium on a platinum electrode.

Grouping frames into regions of similar content can be accomplished by considering the total change in motion information in the frames. The cumulative sum of squared differences for each point provided a measure of the total change having occurred to a point. The sum of squared differences allowed frames to be grouped based on similarity of total change. This measure of the total change provided a simple method of identifying regions based on similar levels. FIG. 15 shows an example of the sum of squared differences for a video. Areas of little change remain flat, while changes will appear as quick increases or jumps.

To find points best indicating where transitions occur, characteristics indicating a change in motion information were defined. Between each frame, the change can be measured as the total distance between points, and the angle of the vector formed by the points relative to the independent axis. As each of these increases, the amount of measurable change also increases. To quantify this, a relevance measure was defined for each pair of points as:

$$\Delta y = y_i - y_{i+1}$$

$$\theta = \tan^{-1} \Delta y$$

$$R = |\theta \cdot \Delta y|$$

For each pair of adjacent points, the relevance measure R was calculated. This measured the total change contributed by each of the components. The net change, denoted as $\Delta y$, is the change in distance between points. Since the points measured by the sum of squared differences are the distance from the origin, the net change is the difference between the point values. Large distances between points indicate a large amount of change over this time. The angle was measured between the vector formed by the two points and the horizontal axis. In areas with little change, the sum of squared difference will be nearly flat, which will result in angle near zero. For regions of large change, the signal increases rapidly, resulting in angles near 90 degrees.

Algorithm Results

Before automated analysis was performed, the frames in the video were manually reviewed for boundaries based on visual change. These manually identified periods are listed in Table 1. There are three periods of change noted in the video. The detection algorithm was run against the same video with results recorded in Table 2. These results were consistent with the manually annotated results.

TABLE 1

Manual Frame Annotations

| Frame Start | Frame End | Type |
|---|---|---|
| 1 | 185 | No Change |
| 186 | 242 | Change (Growth) |
| 243 | 266 | Change (Shrinkage) |
| 267 | 278 | Change (Background Replacement) |
| 279 | 387 | No Change |

TABLE 2

Region Boundaries Identified by Detection Algorithm

| Frame Start | Frame End |
|---|---|
| 186 | 209 |
| 259 | 266 |
| 267 | 278 |

Figure 16:
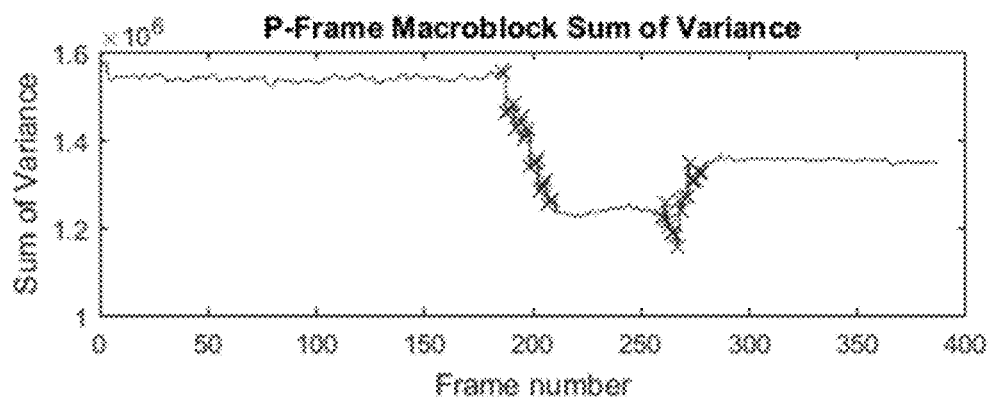
FIG. 16 is a graph of macroblock sum of variance versus frame number for predicted-frames for video data obtained from a series of scanning transmission electron microscope images depicting the deposition of lithium on a platinum electrode, with transition areas indicated.
Figure 17:
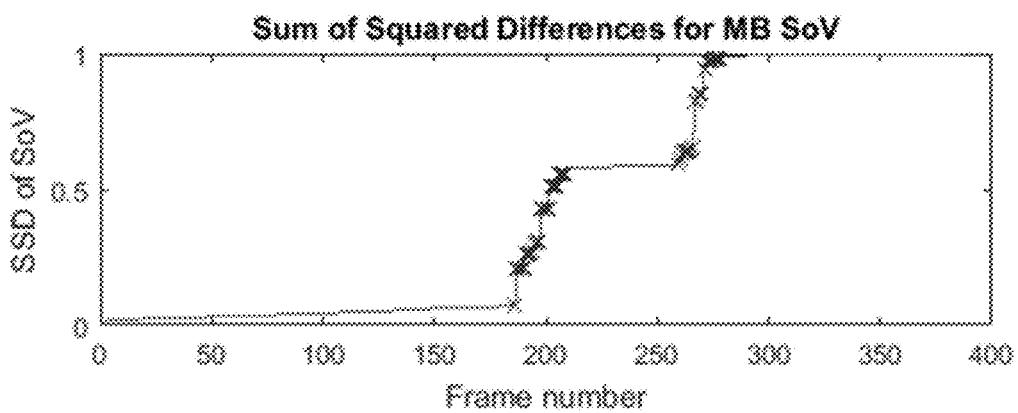
FIG. 17 is a graph of the cumulative sum of squares of the macroblock sum of variance versus frame number for video data obtained from a series of scanning transmission electron microscope images depicting the deposition of lithium on a platinum electrode, with transition areas indicated.

The algorithm identifies points of change that form a transition, while the regions between transitions can be grouped into areas of similar content. It can be seen that the algorithm identified the regions where the most change occurred. These regions are summarized in FIGS. 16 and 17, which show the points identified in the original signal as well as the squared sum of differences.

Figure 18:
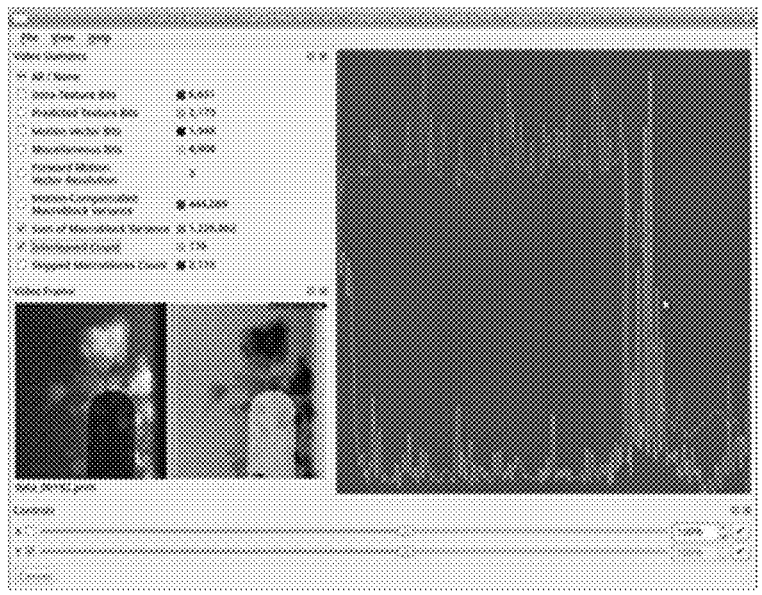
FIGS. 18 and 19 are screen shots of displays of an interactive metadata visualization tool that can be used to view metadata types and values associated with the compression of a series of scanning transmission electron microscope images depicting the deposition of lithium on a platinum electrode.
Figure 19:
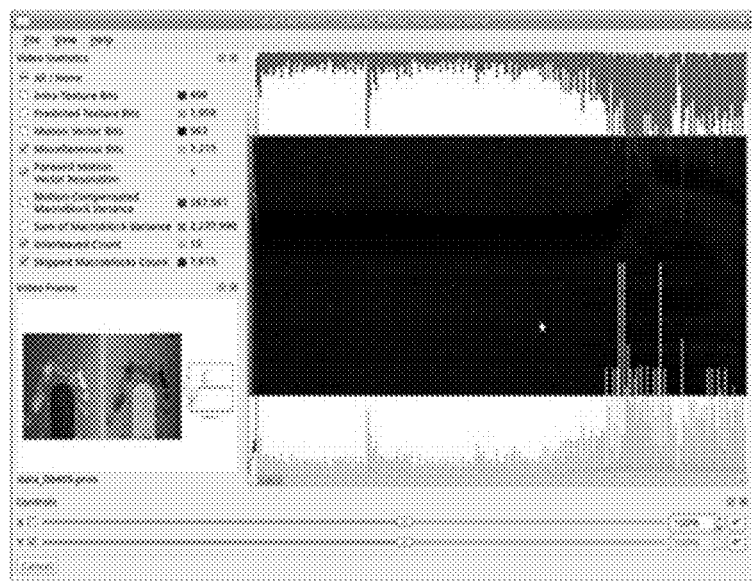

FIGS. 18 and 19 illustrate screen shots of an interactive display used to identify changes in statistics generated during video encoding. Various statistics of interest could be selected for viewing by checking the appropriate box. The display can present an image corresponding to a particular statistical value of interest.

Example 4—Compression Algorithm Analysis of 1D $^1$H-NMR Spectra

With 1D $^1$H-NMR runs often comprising hundreds or thousands of scans, and taking several man-hours to analyze, it can be useful to be able to determine when further scans will not increase the quality of the signal with respect to the noise level (the point of diminishing returns). It may also be useful to detect faults in the data that can compromise its integrity. To this end, this Example 4 describes a technique for analyzing streaming data, a scan-at-a-time, from a NMR spectrometer to detect the point of diminishing returns, as well as certain types of instrument faults.

AN MPEG-2 video encoder can generate metadata that can provide information about motion vectors, macroblocks, number of bits encoded, etc. In the case of the $^1$H-NMR spectra, the motion vector bits, which has been shown to be an effective indicator of change between a series of frames, was used to detect the point of diminishing returns. The macroblock SoV coefficient, which estimates the total motion for a macroblock, was used to detect faults.

Figure 20:
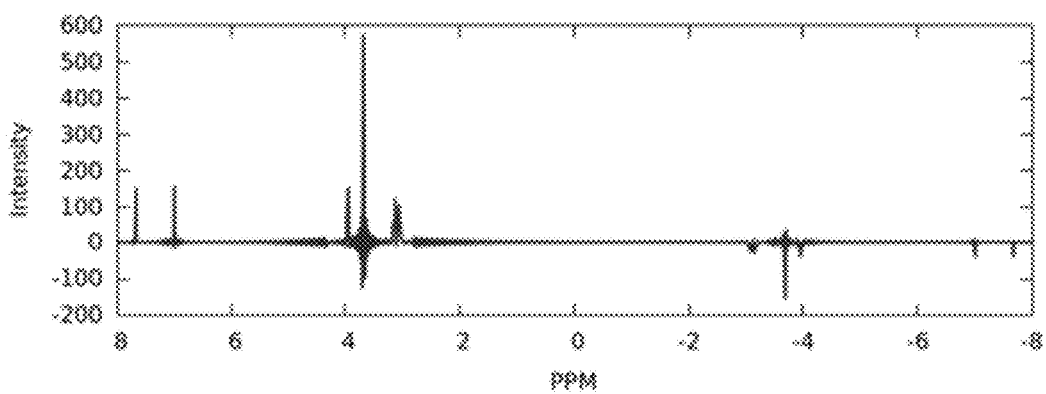
FIG. 20 is a simulated $^1$H-NMR spectrum (intensity versus ppm) for 1-methylhistidine with no noise applied to the data set.
Figure 21:
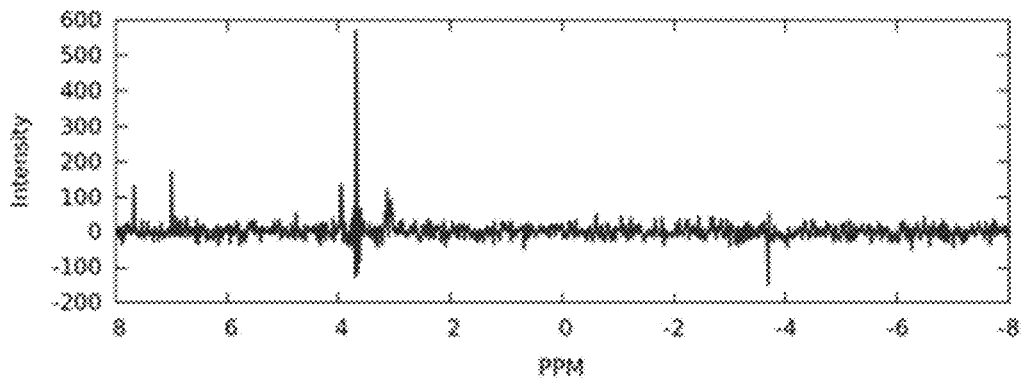
FIG. 21 is a simulated $^1$H-NMR spectrum (intensity versus ppm) for 1-methylhistidine with a medium level of noise applied to the data set.

$^1$H-NMR spectra were simulated using chemical shifts for 1-methylhistidine (HMDB00001), available at http://www.hmdb.ca/metabolites/HMDB00001. A data set was generated into which four different types of isolated faults were inserted: a quad phase shift fault, imaginary amplifier gain, DC imbalance in the real channel, and DC imbalance in the imaginary channel. Four different noise levels were applied to the data set: clean (0 dB, FIG. 20), low (0.25 dB), medium (0.75 dB, FIG. 21), and high (2 dB).

Figure 22:
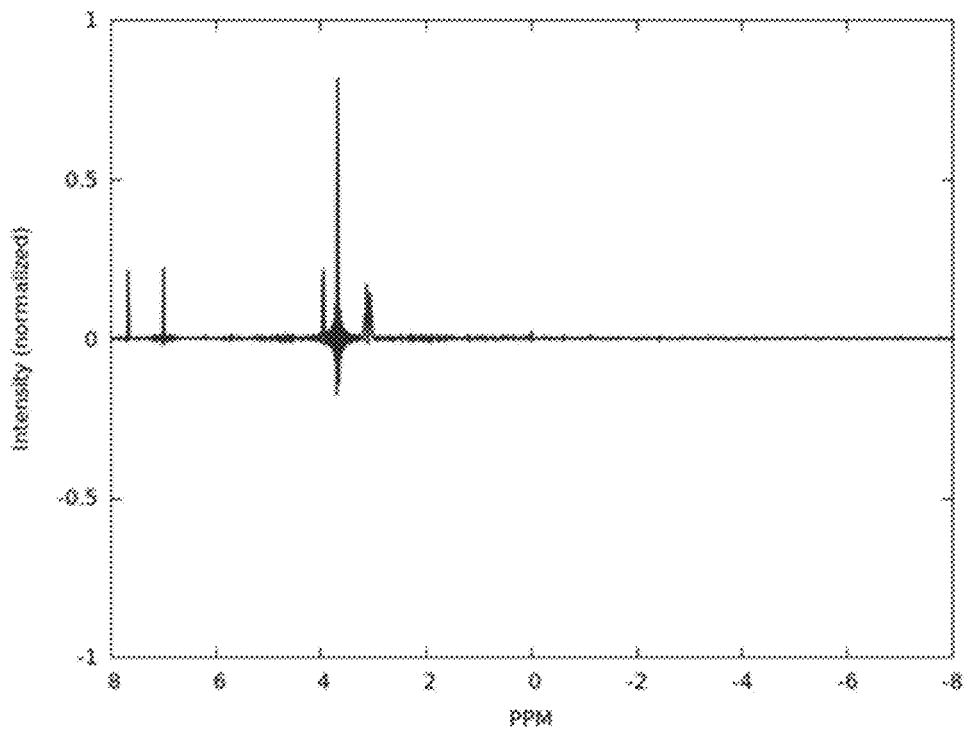
FIG. 22 is a summed, normalized simulated $^1$H-NMR spectrum (intensity versus ppm) for 1-methylhistidine with a medium level of noise applied to the data set.
Figure 23:
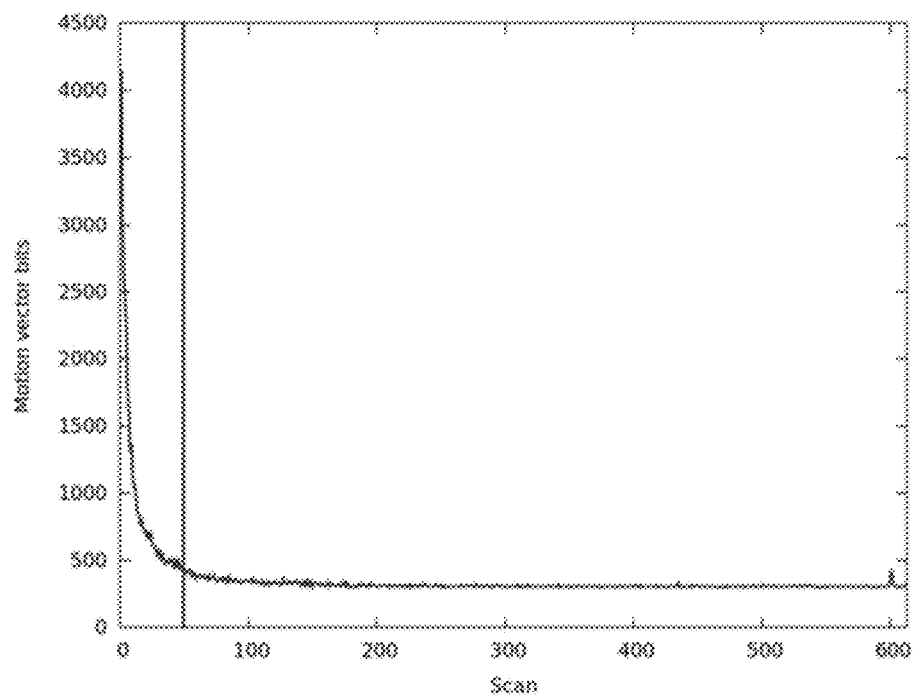
FIG. 23 is a graph of motion vector bits versus number of scans for a series of simulated 1H-NMR spectra for 1-methylhistidine with a medium level of noise applied to the data set.

To detect the point of diminishing returns, the $^1$H-NMR spectra from each scan were progressively summed the result normalized to a range of [−1.0, 1.0]. The summed and normalized spectra were plotted (FIG. 22) and a video encoder was used to compress a video of the plots. As the spectra were progressively summed, the differences between plots diminished, and consequently the motion vector bits decreased (FIG. 23). The point of diminishing returns occurred when the count of bits decreased below a set threshold.

Figure 24:
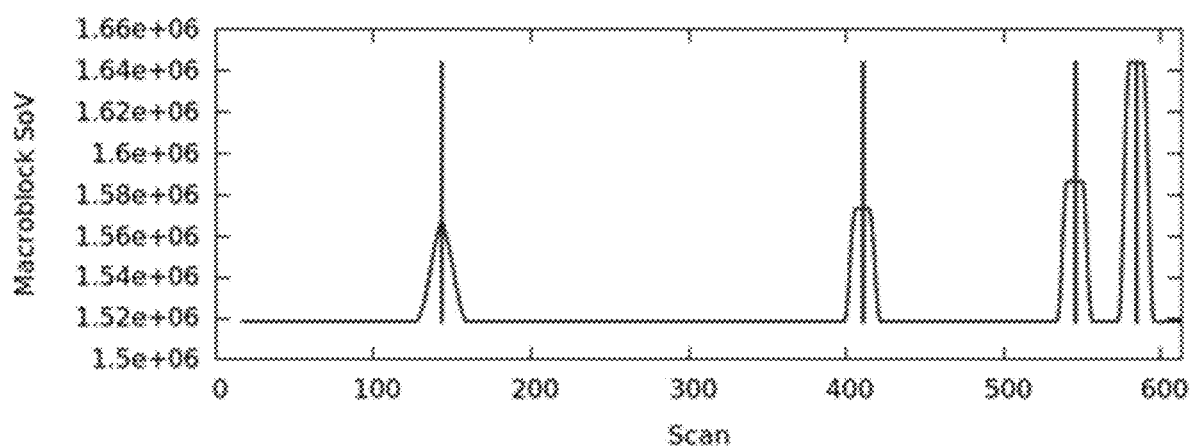
FIG. 24 is a graph of a sliding window of summed macroblock sum of variance values versus number of scans for a series of simulated $^1$H-NMR spectra for 1-methylhistidine with no noise applied to the data set.
Figure 25:
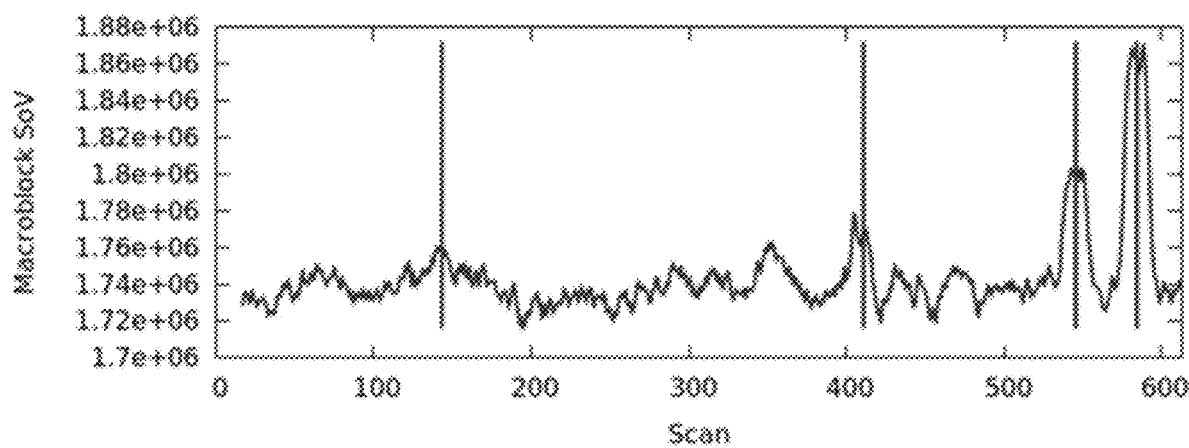
FIG. 25 is graph of a sliding window of summed macroblock sum of variance values versus number of scans for a series of simulated $^1$H-NMR spectra for 1-methylhistidine with a medium level of noise applied to the data set.

To detect faults in the spectra, the $^1$H-NMR spectra were summed using a sliding window, rather than summing all of the spectra from the start of the experiment. A video of these plots was compressed. The macroblock SoV value, which stays relatively stable until a fault occurs, was used to detect where faults occurred (FIGS. 24 and 25).

This technique provided a flexible method for analyzing $^1$H-NMR spectra. It need not require a potentially costly modification to the instrument, since it can be applied to the data stream that is already provided.

Example 5—Representative Computing Environment

FIG. 26 depicts a generalized example of a suitable computing environment (e.g., computing system) 700 in which the described innovations may be implemented. The computing environment 700 is not intended to suggest any limitation as to scope of use or functionality, as the innovations may be implemented in diverse general-purpose or special-purpose computing systems. For example, the computing environment 700 can be any of a variety of computing devices (e.g., desktop computer, laptop computer, server computer(s), tablet computer, etc.).

With reference to FIG. 26, the computing environment 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 26 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more innovations described herein, in the form of computer-executable instructions suitable for execution by the processing unit(s).

A computing system may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The tangible storage 740 may be removable or non-removable, and includes magnetic disks, magnetic tapes or cassettes, CD-ROMs, DVDs, or any other medium which can be used to store information in a non-transitory way and which can be accessed within the computing environment 700. The storage 740 stores instructions for the software 780 implementing one or more innovations described herein.

The input device(s) 750 may be a touch input device such as a keyboard, mouse, pen, or trackball, a voice input device, a scanning device (such as to provide scanned images for use in training a machine learning software component or images to be classified or otherwise analyzed, such as in an Example of the present disclosure), or another device that provides input to the computing environment 700.

The input device(s) 750 can also include one or more data sources. One data source 750 can be a camera, such as video or photographic camera that can be a standalone device or incorporated into another device (such as a camera in a laptop, tablet-computing device, or smartphone). Other data sources 750 can include scientific instruments such as microscopes or spectrometers, sources of textual data, or sources of audio data.

The output device(s) 760 may be a display, printer, speaker, CD-writer, or another device that provides output from the computing environment 700.

The communication connection(s) 770 enable communication over a communication medium to another computing entity, which may also be configured as described in this Example 5. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The communication connection(s) 770 can be used to receive information for use in one or more of the Examples of the present disclosure. For example, the communication connection(s) 770 can be used to send or receive data, such as image data, to be used as a data set for a feature identification/classification component, or send or receive captured task-specific metadata.

Although direct connection between computer systems is shown in some examples, in practice, components can be arbitrarily coupled via a network that coordinates communication.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or nonvolatile memory components (such as flash memory or hard drives)) and executed on a computer (e.g., any commercially available computer, including smart phones or other mobile devices that include computing hardware). The term computer-readable storage media does not include communication connections, nor does it include transitory propagating signals or carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-Programmable Gate Arrays (FPGAs), Application-Specific Integrated Circuits (ASICs), Application-Specific Standard Products (ASSPs), System-On-a-Chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

Example 6—Cloud-Supported Environment

Figure 27:
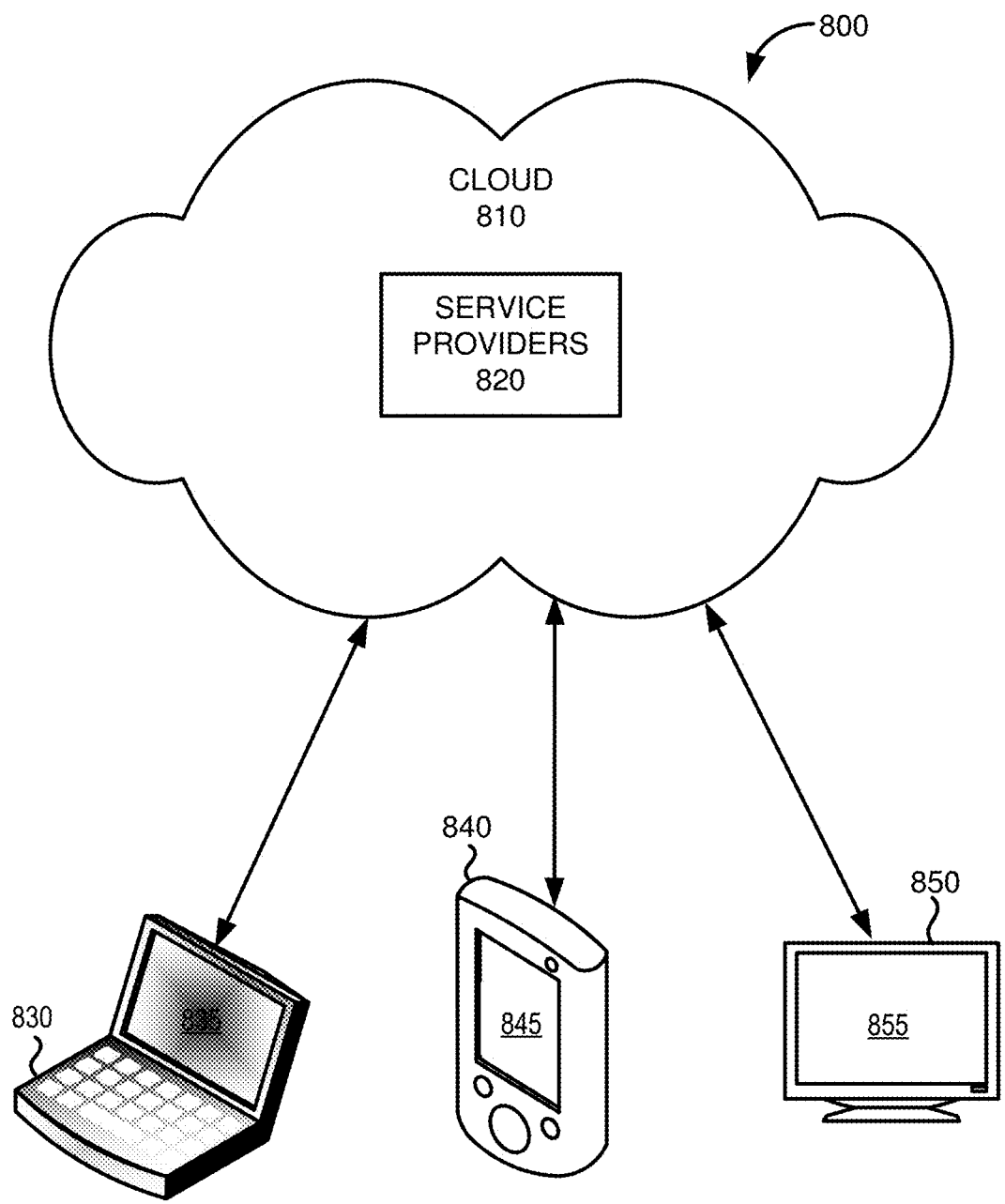
FIG. 27 is an example cloud-support environment that can be used in conjunction with the technologies described herein.

FIG. 27 is an example cloud-support environment that can be used in conjunction with the technologies described herein. In example environment 800, the cloud 810 provides services for connected devices 830, 840, 850 with a variety of screen capabilities. Connected device 830 represents a device with a computer screen 835 (e.g., a mid-size screen). For example, connected device 830 could be a personal computer such as desktop computer, laptop, notebook, netbook, or the like. Connected device 840 represents a device with a mobile device screen 845 (e.g., a small size screen). For example, connected device 840 could be a mobile phone, smart phone, personal digital assistant, tablet computer, and the like. Connected device 850 represents a device with a large screen 855. For example, connected device 850 could be a television screen (e.g., a smart television) or another device connected to a television (e.g., a set-top box or gaming console) or the like. One or more of the connected devices 830, 840, 850 can include touch screen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 800. For example, the cloud 810 can provide services for one or more computers (e.g., server computers) without displays.

Services can be provided by the cloud 810 through cloud service providers 820, or through other providers of online services (not depicted). For example, cloud services can be customized to the screen size, display capability, and/or touch screen capability of a particular connected device (e.g., connected devices 830, 840, 850).

In example environment 800, the cloud 810 provides the technologies and solutions described herein (including one or more (including all) of the subcomponents of the feature identification/classification components 105 or 305 of FIGS. 1 and 3, respectively) to the various connected devices 830, 840, 850 using, at least in part, the service providers 820. For example, the service providers 820 can provide a centralized solution for various cloud-based services. The service providers 820 can manage service subscriptions for users and/or devices (e.g., for the connected devices 830, 840, 850 and/or their respective users).

Non-Transitory Computer-Readable Media

Any of the computer-readable media herein can be non-transitory (e.g., memory, magnetic storage, optical storage, solid-state drives, or the like).

Storing in Computer-Readable Media

Any of the storing actions described herein can be implemented by storing in one or more computer-readable media (e.g., computer-readable storage media or other tangible media).

Any of the things described as stored can be stored in one or more computer-readable media (e.g., computer-readable storage media or other tangible media).

Methods in Computer-Readable Media

Any of the methods described herein can be implemented by computer-executable instructions in (e.g., encoded on) one or more computer-readable media (e.g., computer-readable storage media or other tangible media). Such instructions can cause a computer to perform the method. The technologies described herein can be implemented in a variety of computing languages, including programming languages, markup languages, or combinations thereof.

Methods in Computer-Readable Storage Devices

Any of the methods described herein can be implemented by computer-executable instructions stored in one or more computer-readable storage devices (e.g., memory, magnetic storage, optical storage, solid-state drives, or the like). Such instructions can cause a computer to perform the method.

Alternatives

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. We therefore claim as our invention all that comes within the scope and spirit of the claims.

We claim:

1. A method for identifying or classifying a feature of a data set, the method comprising:
   receiving the data set, the data set comprising data associated with the feature;
   processing the data set with a task-specific processing component to generate task-specific metadata, the task-specific metadata indicating decisions or observations made by the task-specific processing component for production of a task-specific output, and wherein the task-specific metadata is different than the task-specific output;
   with a metadata capture component, the metadata capture component being separate from the task-specific processing component, capturing at least a portion of the task-specific metadata to produce captured metadata; and
   identifying or classifying the feature based on analysis of the captured metadata, wherein the identifying or classifying is not carried out by the task-specific processing component and:
   (1) the identifying or classifying is not used solely in the production of, or the creation of an association with, the task-specific output and the identifying or classifying is not the task-specific output; and
   (2) the identifying or classifying comprises one or both of (i) displaying at least a first portion of the task-specific metadata; or (ii) submitting at least a second portion of the task-specific metadata to a machine learning algorithm to provide a classification result.

2. The method of claim 1, wherein the task-specific processing component is selected from the group consisting of an audio encoder, an audio decoder, a video encoder, a video decoder, a text compression engine, or a natural language processing engine.

3. The method of claim 1, further comprising:
   receiving, at a formatting component, the data set, the data set being in a first format unusable by the task-specific processing component; and
   with the formatting component, converting the data set to a second format useable by the task-specific processing component.

4. The method of claim 1, wherein identifying or classifying the feature comprises comparing some of the captured metadata associated with a first data element of the data set with some of the captured metadata associated with a second data element of the data set.

5. The method of claim 1, wherein identifying or classifying the feature comprises comparing one or more metadata types of the captured metadata with one or more threshold values.

6. The method of claim 1, further comprising generating an output indicating the identification or classification of the feature.

7. One or more computer-readable media having stored therein computer-executable instructions for causing a computer system programmed thereby to perform operations for task-specific processing and metadata capture, the operations comprising:
   receiving measurements recorded by an instrument, the measurements being in a first format unusable by a task-specific processing component;
   converting the measurements to a data set in a second format useable by the task-specific processing component;
   processing the data set, the data set comprising data associated with a feature of the measurements, with the task-specific processing component to generate task-specific metadata, the task-specific metadata indicating decisions or observations made by the task-specific processing component for production of a task-specific output, wherein the task-specific metadata is different than the task-specific output; and
   with a component separate from the task-specific processing component, capturing at least a portion of the task-specific metadata to produce captured task-specific metadata.

8. The one or more computer-readable media of claim 7, wherein the operations further comprise:
   identifying or classifying the feature of the measurements based on analysis of the captured task-specific metadata; and
   generating an output indicating the identification or classification of the feature of the measurements.

9. The one or more computer-readable media of claim 8, wherein the output comprises a display element, the display element comprising one or more of:
   at least a portion of the captured task-specific metadata; and
   an element of the data set.

10. The one or more computer-readable media of claim 8, wherein the output comprises a notification indicating the identification or classification of the feature of the measurements.

11. A computer system providing a feature identification or classification tool usable to identify or classify a feature of a data set, the computer system comprising one or more processors and one or more memories coupled to the one or more processors, the one or more memories comprising computer-executable instructions that, when executed on the one or more processors, cause the computer system to perform operations comprising:
   receiving the data set, the data set comprising data associated with the feature;
   processing the data set with a task-specific processing component to generate task-specific metadata, the task-specific metadata indicating decisions or observations made by the task-specific processing component for production of a task-specific output that metadata is captured by a component different than the task-specific processing component;
   with a metadata capture component, the metadata capture component being separate from the task-specific processing component, capturing at least a portion of the task-specific metadata to produce captured metadata; and
   rendering for display a screen of a graphical user interface, the rendering comprising:
   rendering one or more user interface elements useable to select metadata types of the captured metadata to be displayed on the screen; and rendering one or more metadata values for metadata types of the captured metadata selected to be displayed.

12. The computer system of claim 11, wherein the task-specific processing component is selected from the group consisting of an audio encoder, an audio decoder, a video encoder, a video decoder, a text compression engine, or a natural language processing engine.

13. The computer system of claim 11, the operations further comprising:
   receiving, at a formatting component, the data set, the data set being in a first format unusable by the task-specific processing component; and
   with the formatting component, converting the data set to a second format useable by the task-specific processing component.

14. The computer system of claim 11, the operations further comprising identifying or classifying the feature based on analysis of the captured metadata.

15. The computer system of claim 14, wherein the identifying or classifying is not used solely in the production of, or the creation of an association with, the task-specific output.

16. The computer system of claim 14, wherein identifying or classifying the feature comprises comparing some of the captured metadata associated with a first data element of the data set with some of the captured metadata associated with a second data element of the data set.

17. The computer system of claim 14, wherein identifying or classifying the feature comprises comparing one or more metadata types of the captured metadata with one or more threshold values.

18. The computer system of claim 14, the operations further comprising generating an output indicating the identification or classification of the feature.

19. The computer system of claim 11, wherein rendering one or more metadata values comprises rendering one or more metadata values for each of a plurality of times.

20. The computer system of claim 19, the operations further comprising:
   receiving user input selecting a time of the plurality of times;
   rendering for display metadata values of the captured metadata values at the selected time; and
   rendering at least one of video or audio content associated with the data set at the selected time.

* * * * *